(12) United States Patent
Aramoto et al.

(10) Patent No.: US 10,582,369 B2
(45) Date of Patent: *Mar. 3, 2020

(54) MOBILE STATION, POSITION MANAGEMENT APPARATUS, MOBILE COMMUNICATION SYSTEM AND COMMUNICATION METHOD

(71) Applicant: SHARP KABUSHIKI KAISHA, Sakai, Osaka (JP)

(72) Inventors: Masafumi Aramoto, Osaka (JP); Hirokazu Naoe, Osaka (JP)

(73) Assignee: Sharp Kabushiki Kaisha, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,182

(22) Filed: Apr. 26, 2019

(65) Prior Publication Data

US 2019/0253871 A1     Aug. 15, 2019

Related U.S. Application Data

(63) Continuation of application No. 14/985,051, filed on Dec. 30, 2015, now Pat. No. 10,278,059, which is a (Continued)

(30) Foreign Application Priority Data

Jun. 26, 2009  (JP) ................................ 2009-152002

(51) Int. Cl.
*H04W 8/08* (2009.01)
*H04W 76/10* (2018.01)
(Continued)

(52) U.S. Cl.
CPC ............ *H04W 8/082* (2013.01); *H04W 8/18* (2013.01); *H04W 76/10* (2018.02); *H04W 80/04* (2013.01); *H04W 84/045* (2013.01)

(58) Field of Classification Search
None
See application file for complete search history.

(56) References Cited

U.S. PATENT DOCUMENTS

| 9,258,697 B2 * | 2/2016 | Aramoto ............... H04W 8/082 |
| 10,278,059 B2 * | 4/2019 | Aramoto ............... H04W 8/082 |

(Continued)

FOREIGN PATENT DOCUMENTS

| JP | 6-245255 A | 9/1994 |
| WO | WO 2008/134281 A2 | 11/2008 |

(Continued)

OTHER PUBLICATIONS

3GPP, "3rd Generation Partnership Project; Technical Specification Group Services and System Aspects; Service requirements for Home NodeBs and Home eNodeBs (Release 9)", 3GPP TS 22.220, V1.2.0, Feb. 2009, pp. 1-25.

(Continued)

*Primary Examiner* — Mohammad S Adhami
(74) *Attorney, Agent, or Firm* — Birch, Stewart, Kolasch & Birch, LLP

(57) ABSTRACT

A system includes a bases station including circuitry configured to receive a signal regarding an attach procedure; transmit, to a position management apparatus, the attach procedure signal together with a CSGID, based on receiving the attach procedure signal; receive an attachment acceptance together with fourth information from the position management apparatus, as a response to the signal regarding the attach procedure, wherein the fourth information is permission information indicating that Local IP Access (LIPA) is permitted; and transmit an attachment acceptance without including the fourth information to the mobile station apparatus, after receiving the attachment acceptance; and a mobile station including circuitry able to transmit first information corresponding to Local IP access (LIPA) for connecting to a network without passing through a core network, and in a case that LIPA is permitted, to perform data reception and transmission with the network without passing through the core network.

5 Claims, 16 Drawing Sheets

Related U.S. Application Data continuation of application No. 13/380,246, filed as application No. PCT/JP2010/060563 on Jun. 22, 2010, now Pat. No. 9,258,697.

(51) Int. Cl.
  *H04W 8/18* (2009.01)
  *H04W 84/04* (2009.01)
  *H04W 80/04* (2009.01)

(56) References Cited

U.S. PATENT DOCUMENTS

| | | | |
|---|---|---|---|
| 2009/0232019 A1* | 9/2009 | Gupta | H04L 12/287 370/252 |
| 2010/0120461 A1 | 5/2010 | Mori | |
| 2010/0159899 A1* | 6/2010 | Horn | H04L 63/10 455/414.1 |
| 2010/0284299 A1 | 11/2010 | Bi et al. | |
| 2012/0002608 A1 | 1/2012 | Vesterinen et al. | |
| 2012/0039214 A1* | 2/2012 | Kim | H04L 12/14 370/254 |
| 2012/0039304 A1* | 2/2012 | Kim | H04W 28/08 370/332 |
| 2012/0076047 A1* | 3/2012 | Turanyi | H04W 76/10 370/254 |

FOREIGN PATENT DOCUMENTS

| | | |
|---|---|---|
| WO | WO 2008/136422 A1 | 11/2008 |
| WO | WO 2010/113528 A1 | 10/2010 |
| WO | WO 2010/128773 A2 | 11/2010 |
| WO | WO 2011/02187 A2 | 2/2011 |

OTHER PUBLICATIONS

3GPP, "Technical Specification Group Services and System Aspects; Architecture aspects of Home NodeB and Home eNodeB (Release 9)", 3GPP TR 23.830 V0.5.0, pp. 1-6 and 43-45, May 2009.
3GPP, "Technical Specification Group Services and System Aspects; General Packet Radio Service (GPRS) enhancements for Evolved Universal Terrestrial Radio Access Network (E-UTRAN) access (Release 8)", 3GPP TS 23.401 V8.6.0, pp. 1-8 and 160-166, Jun. 2009.
3GPP, "Technical Specification Group Services and System Aspects; Service requirements for Home NodeBs and Home eNodeBs (Release 9)", 3GPP TS 22.220 V9.1.0, pp. 1-4 and 12-14, Jun. 2009.
China Mobile, "Local IP access principles for single PDN connection solutions", 3GPP TSG-SA2 Meeting #73, S2-093803, Tallinn, Estonia, 28 pages, May 11-15, 2009.
3GPP, "IP connectivity Issues in Local IP access" TD S2-093508—TSG SA WG2 Meeting #73 30 May 11-15, 2009, Tallinn, Estonia.
3GPP, "Local IP Access Baseline Solution for EHNB" to S2-092308—TSG SA WG2 Meeting #72 Mar. 30-Apr. 3, 2009, Hangshou, China.
3GPP, "On HNB and HeNB Interfaces for LIPA" TD S2-093378—TSG SA WG2 Meeting #73, May 11-15, 2009, Tallinn, Estonia.
China Mobile ZTE, "Access Control for LIPA Services", May 2009, 3GPP TSG SA WG2 Meeting #74, TD 52-093223 (Year: 2009).
Corrected Notice of allowance issued in related U.S. Appl. No. 14/985,051 dated Feb. 21, 2019.
European Search Report dated Apr. 25, 2016 for EP Application No. 10792103.3.
Examination Search Report dated Dec. 7, 2017 issued in corresponding Canadian Application No. 2,766,314.
Final Office Action issued in related U.S. Appl. No. 14/985,051 dated Jun. 15, 2017.
Final Office Action issued in related U.S. Appl. No. 14/985,051 dated May 24, 2018.
Notice of Allowance issued in related U.S. Appl. No. 14/985,051 dated Dec. 17, 2018.
Office Action issued in related U.S. Appl. No. 14/985,051 dated Jan. 19, 2018.
Office Action issued in related U.S. Appl. No. 14/985,051 dated Nov. 18, 2016.
VODAFONE : Introduction of local breakout from HNB for GN/GP SGSN, 3GPP Draft; S2-094053, 3rd Gen PTP Proj (3GPP), Mobile Competence Centre; 650, Rte Des Lucioles; F-06921 Sophia-Antipolis Cedex; FR, No. Tallinn; May 15, 2009, (May 15, 2009), XP050347034, para [6.12.1].

\* cited by examiner

| UE's IP Address Prefix | Transmission Path |
|---|---|
| UE1_HNP1 | PMIP Tunnel 1 |

| UE Identifier | CSG Identifier | Available Service | |
| --- | --- | --- | --- |
| | | Class 1<br>Internet<br>Connection | Class 2<br>Home Network<br>Connection |
| UE1 | CSGID1 | Disallowed | Allowed |
| | CSGID2 | Allowed | Disallowed |
| UE2 | CSGID1 | Allowed | Disallowed |

| UE Identifier | CSG Identifier | Available Service | |
| --- | --- | --- | --- |
| | | Class 1 Internet Connection | Class 2 Home Network Connection |
| UE1 | CSGID1 | Disallowed | Allowed |
| | CSGID2 | Allowed | Disallowed |

| APN | PGW IP Address | SGW IP Address |
| --- | --- | --- |
| WEB | 2001:200:1: :1 | 2001:200:2: :1 |

| UE Identifier | Pre-translation Address | Post-translation Address |
|---|---|---|
| UE1 | UE1_HNP1 | 2001:100:200:4000: :1 |

| Service Class | Filtering Rule |
|---|---|
| Class 1<br>Internet Connection | 1. allow all<br>2. disallow IPv6=2001:100:200:3000: :/64 |
| Class 2<br>Home Network Connection | 1. disallow all<br>2. allow IPv6=2001:100:200:3000: :/64 |
| Class 3<br>Internet Connection and<br>Home Network Connection | 1. allow all |

| UE Identifier | Available Service | |
|---|---|---|
| | Class 1<br>Internet Connection | Class 2<br>Home Network Connection |
| UE1 | Disallowed | Allowed |
| UE2 | Allowed | Disallowed |

MOBILE STATION, POSITION MANAGEMENT APPARATUS, MOBILE COMMUNICATION SYSTEM AND COMMUNICATION METHOD

This application is a Continuation of co-pending U.S. application Ser. No. 14/985,051 filed Dec. 30, 2015, which is a Continuation of U.S. application Ser. No. 13/380,246 filed Dec. 22, 2011 (now U.S. Pat. No. 9,258,697 issued Feb. 9, 2016), which is a U.S. National Phase filing of International Application No. PCT/JP2010/060563, filed on Jun. 22, 2010, which claims benefit of priority under 35 U.S.C. 119(a) to Japanese Patent Application No. 2009-152002 filed in Japan on Jun. 26, 2009, all of which are hereby expressly incorporated by reference into the present application.

TECHNICAL FIELD

The present invention relates to a mobile communication system and the like.

BACKGROUND ART

Mobile communication system standardization group, 3GPP (The 3rd Generation Partnership Project) is investigating EPS (Evolved Packet System) as a next generation mobile telecommunication system, and studying HeNB (Home eNodeB) as a small base station installed in a residence or the like as an EPS configurational apparatus (which will be referred to hereinbelow as home base station).

The home base station forms a small-scale wireless cell called a femtocell, which accommodates UEs (User Equipment: mobile terminal devices) using the same wireless access technique as that of a normal base station and establishes connection to the core network of the mobile communication system via a broadband line to be able to relay communication data of UEs accommodated therein.

Since the home base station uses the broadband line as backhaul and can be set by a general user, it is possible to easily extend the coverage area of the mobile communication system, especially the indoor coverage area. Further, since the radius of the cell is small and the cell can be exclusively used by a few users, it is possible to expect improvement in communication speed and frequency usage efficiency compared to an outdoor macro cell base station which a large number of users have to share.

Further, in non-patent document 2, local IP access function is defined as a functional requirement of a home base station. The local IP access is to provide for UEs connectivity to the network such as a network inside the home (which will be referred to hereinbelow as "home network") to which the home base station is connected directly. For example, this enables a UE to connect another information terminal (printer etc.) that is connected to the home network (this will be called hereinbelow "home network connection service"), and also enables the UE to connect to the internet without passage of the core network of the mobile communication system (this will be called hereinbelow "internet connection service").

Conventionally, if a UE performs direct communication with an appliance having no cellular communication interface such as a printer or the like, the UE needs to have a local area-use communication interface such as a wireless LAN etc. However, use of local IP access enables even a UE that has a cellular communication interface only to perform communication with other communication terminals within the home network because the home base station functions as a gateway between different wireless access schemes.

Since use of local IP access also makes it possible to connect to the internet without passage of the core network of the mobile communication system, it is possible to distribute traffic load (offload), from the perspective of the mobile network operator.

Further, differing from a microcell base station, the home base station can give access right only to a particular UE based on the form of the usage, three access modes called closed, open and hybrid are defined. Each home station is allotted with a group identifier called CSGID (Closed Subscriber Group Identification). In the closed mode, the home base station can designate UEs to be permitted to connect for every CSGID. In the open mode, the home base station can give the right of access to the home base station to all UEs. In the hybrid mode, which is a combination of the closed mode and open mode, communication of UEs that are given with access right in closed mode can be handled preferentially.

Further, concerning local IP access, it is defined as a requisite that whether or not the user is permitted to use this function should be determined based on the user's subscription information. It is also ruled as a functional requisite that a UE can use local IP access and connection to the core network simultaneously when the UE is connecting to the home base station.

Moreover, non-patent document 3 discloses architecture candidates for embodying a home base station.

Further, in order to realize local IP access functionality of a home base station, non-patent document 4 proposes a configuration in which when communication data is directed to the internet or home network, the home base station forwards the communication data without passing though the core network of the mobile communication system in accordance with the destination of the communication data received from the home base station.

PRIOR ART DOCUMENTS

Non-Patent Documents

Non-patent Document 1: 3GPP TS23.401 General Packet Radio Service (GPRS) enhancements for Evolved Universal Terrestrial Radio Access Network (E-UTRAN) access
Non-patent Document 2: 3GPP TS 22.220
Non-patent Document 3: 3GPP TS 23.830
Non-patent Document 4: 3GPP Contribution S2-093803 (Local IP access principles for single PDN connection solutions)

SUMMARY OF THE INVENTION

Problems to be Solved by the Invention

According to the information disclosed in non-patent document 3, access control at the home base station is determined depending on the aforementioned three access modes and the subscription information based on which whether the local IP access function is permitted to use is determined. However, if the usage scenario of the home base station is considered, it is desirable that the owner of the home base station or the mobile network operator can designate access right in more detail as describe below.

Suppose, for example, a case in which a home base station is set in a home, there is a demand that the family may offer a friend, who visits the residence, only the internet connection service through local IP access but does not want to permit the friend to use home network connection service in view of privacy and security.

Suppose another case in which a home base station is installed in a shopping mall etc., there is a demand that an advertisement distribution server for distributing advertisement information and the like is installed in the home network so as to allow visiting customers to access only the home network connection service through local IP access and so as to provide a connection with an advertisement server, but not to allow them to access internet connection service.

However, because the access control based on the aforementioned access mode and the subscription information themselves cannot offer the scheme to separately designate access right as to a plurality of services that are available through local IP access, there is the problem that the aforementioned usage scenario cannot be realized.

Further, when a UE uses local IP access, not only the communication data the UE transmits by way of the home base station but also the communication data transmitted from another information terminal connected to the home network, to the UE should be limited as to connection depending on the access right.

For example, communication from the information terminal to a UE that is not permitted to access home network connection service should be shut off, whereas if the UE in question is authorized to use internet connection service by way of local IP access, the communication data corresponding to that should be normally transferred to the UE. However, due to the above-described access right problem, it is impossible to filter these packets as it stands.

In addition, a home base station is one that is introduced as a functional extension of the existing mobile communication system, so it is desirable that the change to the current specification is minimized. Accordingly, the specific means for solving the above problems also has to be realized by providing the minimum functional extension to the EPS ruled by the non-patent document 1.

The present invention has been devised in view of the above circumstances, it is therefore an object of the present invention to provide a home base station, a mobile communication system and the like in which, for a plurality of services provided using local IP access functionality of a home base station, the owner of the home base station or the mobile network operator can designate the access right for each service, and transfer and communication path selection of communication data can be performed based on the designated access right.

Means for Solving the Problems

In view of the above problems, a mobile station of the present invention is a mobile station in a mobile communication system including a home base station (HeNB; Home eNodeB), a subscriber information management apparatus (HSS; Home Subscriber Service), a position management apparatus (MME; Mobility Management Entity), an access control apparatus (PGW; Packet data GW) and the mobile station (UE; User Equipment), wherein in order to make a request for establishment of a communication path for local IP access (LIPA) to connect to a home network, a signal relating to an attach procedure is transmitted to a position management apparatus.

The mobile station of the present invention is also characterized in that the signal relating to the attach procedure includes an APN.

The mobile station of the present invention is further characterized in that the communication path is established between the mobile station and a home base station.

A position management apparatus of the present invention is a position management apparatus in a mobile communication system including a home base station (HeNB; Home eNodeB), a subscriber information management apparatus (HSS; Home Subscriber Service), the position management apparatus (MME; Mobility Management Entity), an access control apparatus (PGW; Packet data GW) and a mobile station (UE; User Equipment), wherein a subscriber information management apparatus stores information on whether local IP access (LIPA) to connect to a home network is allowed or not, the position management apparatus receives a signal relating to an attach procedure including an APN (Access Point Name), from a mobile station, confirms, based on the information offered by the subscriber information management apparatus, that the APN provided from the mobile station is allowed for the local IP access to connect to the home network, and, determines whether establishment of a communication path for the local IP access to connect to the home network should be allowed or not.

The position management apparatus of the present invention is also characterized in that the subscription information management apparatus stores a list of a CSG ID in subscription data, and the position management apparatus determines whether establishment of the communication path should be allowed or not, also using the list of the CSG ID obtained from the subscriber information management apparatus.

The position management apparatus of the present invention is further characterized in that when establishment of the communication path is allowed, the position management apparatus transmits an attachment permission to the mobile station in order to establish the communication path.

A position management apparatus of the present invention is a position management apparatus in a mobile communication system including a home base station (HeNB; Home eNode B), a subscriber information management apparatus (HSS; Home Subscriber Service), the position management apparatus (MME; Mobility Management Entity), an access control apparatus (PGW; Packet data GW) and a mobile station (UE; User Equipment), wherein a subscriber information management apparatus stores information on whether local IP access (LIPA) to connect to a home network is allowed or not, when having received a signal relating to an attach procedure including an APN, from a mobile station, and confirmed, based on the information offered by the subscriber information management apparatus, that the APN provided from the mobile station is not allowed for the local IP access to connect to the home network, the position management apparatus will not allow for establishment of a communication path for the local IP access to connect to the home network.

A mobile communication system of the present invention is a mobile communication system including a home base station (HeNB; Home eNode B), a subscriber information management apparatus (HSS; Home Subscriber Service), a position management apparatus (MME; Mobility Management Entity), an access control apparatus (PGW; Packet data GW) and a mobile station (UE; User Equipment), wherein in order to make a request for establishment of a communication path for local IP access (LIPA) to connect to a home network, the mobile station transmits a signal relating to an attach procedure to the position management apparatus.

The mobile communication system of the present invention is characterized in that the signal relating to the attach procedure includes an APN.

The mobile communication system of the present invention is characterized in that the communication path is established between the mobile station and the home base station.

A mobile communication system of the present invention is a mobile communication system including a home base station (HeNB; Home eNode B), a subscriber information management apparatus (HSS; Home Subscriber Service), a position management apparatus (MME; Mobility Management Entity), an access control apparatus (PGW; Packet data GW) and a mobile station (UE; User Equipment), wherein the subscriber information management apparatus stores information on whether local IP access (LIPA) to connect to a home network is allowed or not, the position management apparatus receives a signal relating to an attach procedure including an APN, from the mobile station, confirms, based on the information offered by the subscriber information management apparatus, that the APN provided from the mobile station is allowed for the local IP access to connect to the home network, and, determines whether establishment of a communication path for the local IP access to connect to the home network should be allowed or not.

The mobile communication system of the present invention is also characterized in that the subscription information management apparatus stores a list of a CSG ID in subscription data, and the position management apparatus determines whether establishment of the communication path should be allowed or not, also using the list of the CSG ID obtained from the subscriber information management apparatus.

The mobile communication system of the present invention is further characterized in that when establishment of the communication path is allowed, the position management apparatus transmits an attachment permission to the mobile station in order to establish the communication path.

A mobile communication system of the present invention is a mobile communication system including a home base station (HeNB; Home eNode B), a subscriber information management apparatus (HSS; Home Subscriber Service), a position management apparatus (MME; Mobility Management Entity), an access control apparatus (PGW; Packet data GW) and a mobile station (UE; User Equipment), wherein the subscriber information management apparatus stores information on whether local IP access (LIPA) to connect to a home network is allowed or not, when having received a signal relating to an attach procedure including an APN, from the mobile station, and confirmed, based on the information offered by the subscriber information management apparatus, that the APN provided from the mobile station is not allowed for the local IP access to connect to the home network, the position management apparatus will not allow for establishment of a communication path for the local IP access to connect to the home network.

A communication method of the present invention a communication method in a mobile station of a mobile communication system including a home base station (HeNB; Home eNodeB), a subscriber information management apparatus (HSS; Home Subscriber Service), a position management apparatus (MME; Mobility Management Entity), an access control apparatus (PGW; Packet data GW) and a mobile station (UE; User Equipment), wherein in order to make a request for establishment of a communication path for local IP access (LIPA) to connect to a home network, a signal relating to an attach procedure is transmitted to a position management apparatus.

A communication method of the present invention is a communication method in a position management apparatus of a mobile communication system including a home base station (HeNB; Home eNode B), a subscriber information management apparatus (HSS; Home Subscriber Service), the position management apparatus (MME; Mobility Management Entity), an access control apparatus (PGW; Packet data GW) and a mobile station (UE; User Equipment), wherein the subscriber information management apparatus stores information on whether local IP access (LIPA) to connect to a home network is allowed or not, comprising the steps of:

receiving a signal relating to an attach procedure including an APN from a mobile station;

confirming, based on information offered by a subscriber information management apparatus, that the APN provided from the mobile station is allowed for local IP access to connect to a home network; and, determining whether establishment of a communication path for the local IP access to connect to the home network should be allowed or not.

A communication method of the present invention is a communication method in a position management apparatus of a mobile communication system including a home base station (HeNB; Home eNode B), a subscriber information management apparatus (HSS; Home Subscriber Service), the position management apparatus (MME; Mobility Management Entity), an access control apparatus (PGW; Packet data GW) and a mobile station (UE; User Equipment), wherein the subscriber information management apparatus stores information on whether local IP access (LIPA) to connect to a home network is allowed or not, comprising the steps of:

receiving a signal relating to an attach procedure including an APN, from a mobile station; and, when having confirmed, based on information offered by a subscriber information management apparatus, that the APN provided from the mobile station is not allowed for local IP access to connect to a home network, disallowing establishment of a communication path for the local IP access to connect to the home network.

Advantage of the Invention

According to the present invention, when a mobile terminal apparatus uses service using local IP access functionality of a base station, the owner of the home base station or the mobile network operator can perform access control separately for each service while minimizing the modification of the existing system.

MODES FOR CARRYING OUT THE INVENTION

Next, the best mode for carrying out the present invention will be described with reference to the drawings. In the embodied modes, the embodiment of a mobile communication system to which the present invention is applied will be detailed as an example with reference to the drawings.

1. The First Embodiment

To begin with this, the first embodiment of a mobile communication system to which the present invention is applied will be described with reference to the drawings.

[1.1 Outline of Mobile Communication System]

Figure 1:
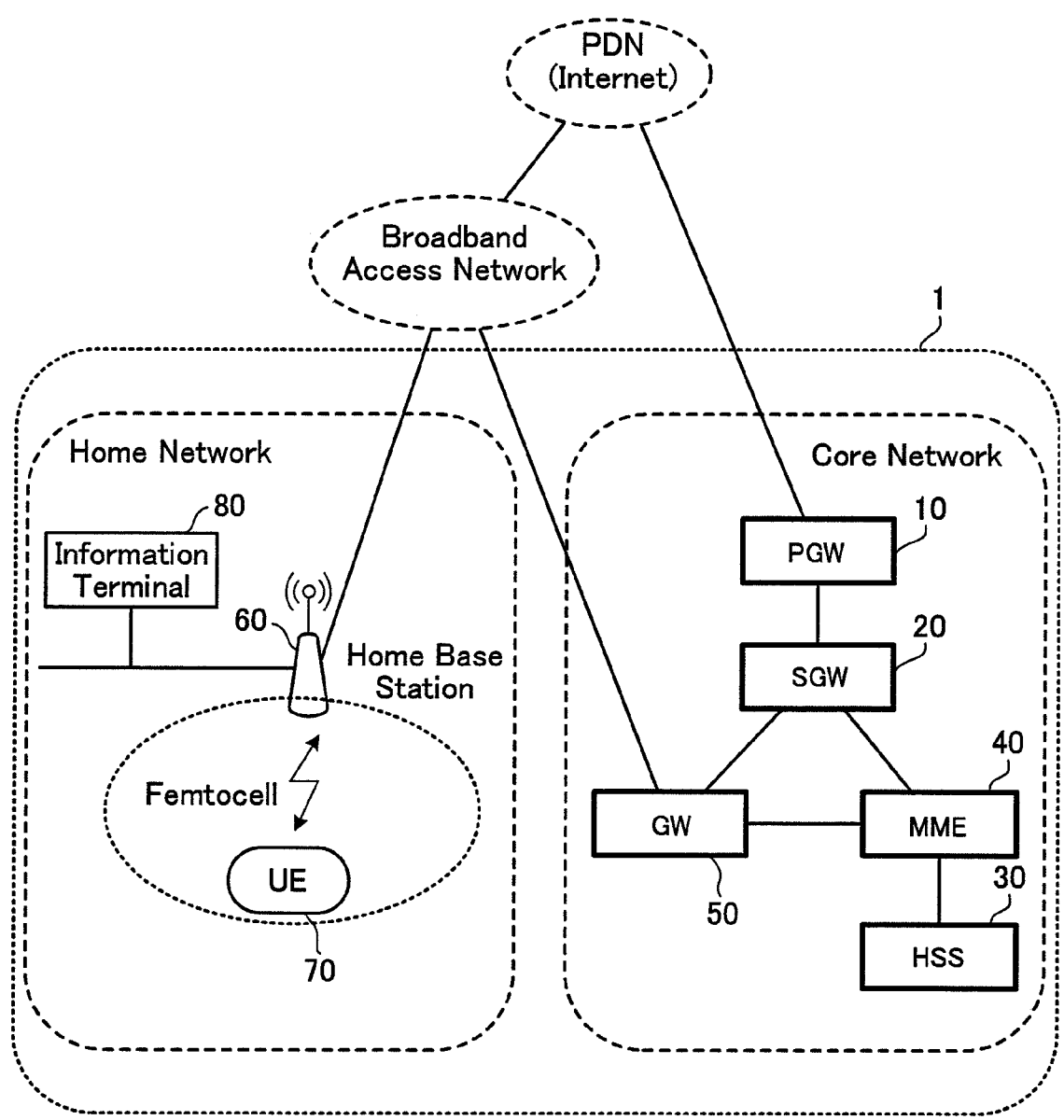
FIG. 1 is a schematic diagram showing a mobile communication system in the first embodiment.

FIG. 1 is a diagram for illustrating the outline of a mobile communication system 1 in the present embodiment. As shown in this figure, mobile communication system 1 is composed of a core network and a home network, the core network and the home network being mutually connected via a broadband access network. The broadband access network is a wired access network for realizing broadband communication, and is constructed by, for example ADSL, optical fibers and the like. However, not limited to this, the broadband access network may be a wireless access network such as WiMAX or the like.

The core network includes a PGW 10 (Packet data GW), a SGW 20 (Serving GW), an HSS 30 (Home Subscriber Service), an MME 40 (Mobility Management Entity) and GW 50.

PGW 10 is an access control apparatus which is connected to foreign PDNs (Packet Data Network: packet communication network) such as the internet and the like, functions as a gateway for connecting the core network with those PDNs and transfers communication data of a UE 70 to SGW 20.

SGW 20 is a service control apparatus that is connected to GW 50 to transfer packets between PGW 10 and home base station 60. Here, it should be noted that PGW 10 and SGW 20 may be physically configured as an identical node.

MME 40 is an entity for performing signaling and is a position management apparatus for leading position management of UE 70 and an EPS bearer establishment process. The EPS bearer is a logical path that is established between home base station 60 and SGW 20 for every UE to transfer user IP packets. Here, UE 70 is able to establish a plurality of EPS bearers.

GW 50 functions as a gateway between home base station 60 installed inside the home network and the apparatuses inside the core network.

HSS 30 is a subscriber information management apparatus that manages subscription data (subscriber information) and performs user authentication and the like to notify MME 40 of the subscription data of UE 70. The subscription data includes subscriber's service subscription information, the list of CSGIDs that are allowed to access, and others.

The home network is composed including UE 70, information terminal 80 and home base station 60. The home network is mutually connected to foreign PDNs via broadband access network.

Home base station 60 is an apparatus that forms a femtocell and accommodates UE 70 as a 3GPP LTE (Long Term Evolution) base station. Further, this also functions as a home gateway in the home network and is connected to the broadband access network.

UE 70 is a mobile communication terminal equipped with a 3GPP LTE communication interface and is connected to home network 60.

Information terminal 80 is an information terminal connected to the home network; examples including printers, network file servers, etc.

[1.2 Apparatus Configuration]

Next, the configuration of each apparatus will be briefly described using the drawings.

[1.2.1 PGW Configuration]

Figures 2, 3:
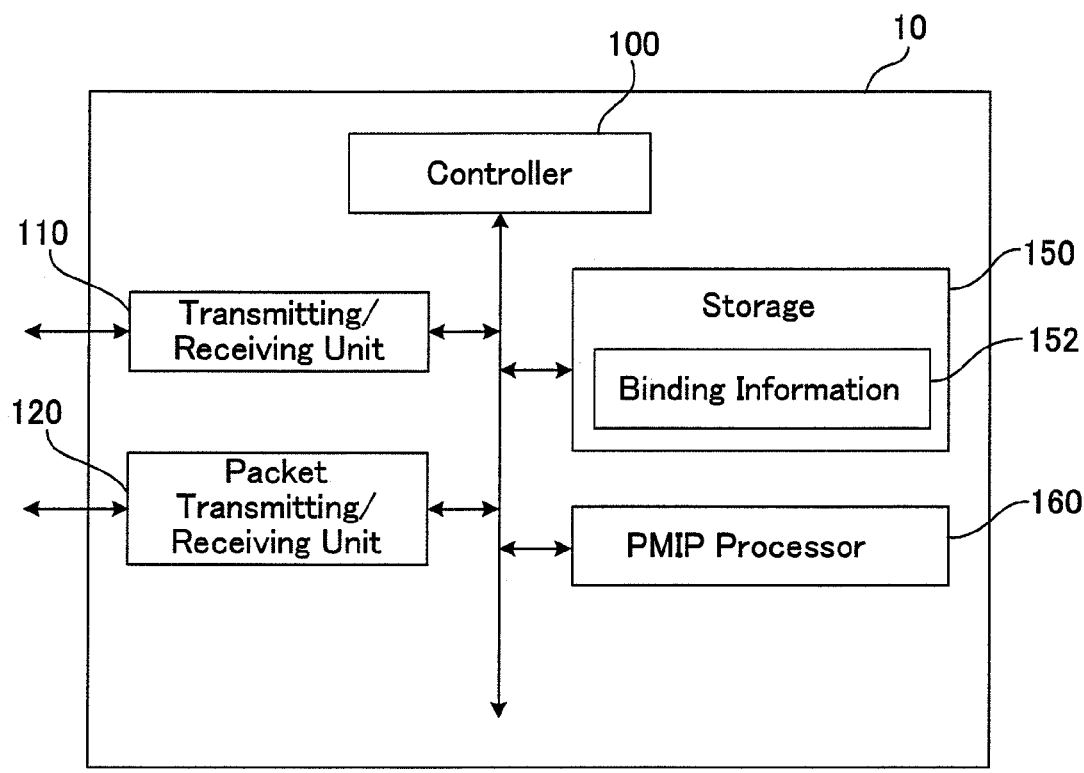
FIG. 2 is a block diagram of a PGW in the first embodiment.
FIG. 3 is a chart showing binding information of the PGW in the first embodiment.

First, the configuration of PGW 10 in the present embodiment will be described. As shown in FIG. 2, PGW 10 includes a controller 100 to which a transmitting/receiving unit 110, a packet transmitting/receiving unit 120, a storage 150 and a PMIP processor 160 are connected by a bus.

Controller 100 is a functional unit for controlling PGW 10. The controller reads out and runs various programs stored in storage 150 to thereby realize various processes.

Transmitting/receiving unit 110 is a functional unit that is wire-connected to a router or a switch to perform transmission and reception of packets. Transmission and reception of packets is performed through, for example, Ethernet (registered trademark), which is generally used as a network connecting standard, or the like.

Storage 150 is a functional unit that stores programs, data and the like necessary for various operations of PGW 10, and is configured of, for example semiconductor memory and the like. Storage 150 also stores binding information 152.

Binding information 152 is the information which PGW 10 uses when receiving communication data (packet) addressed to UE 70, to determine the transmission path for forwarding the communication data to UE 70. FIG. 3 shows one example of binding information.

As shown in FIG. 3, the IP address prefix (which will be referred to hereinbelow as "HNP (Home Network Prefix)" of UE 70 and the transmission path to SGW 20 (e.g., "PMIP tunnel 1") are recorded in a correlated manner. Here, it is assumed that each UE is allotted with a unique HNP, which is used to generate IPv6 address for UE.

Packet transmitting/receiving unit 120 is a functional unit for transmitting and receiving specific data (packets). The packet transmitting/receiving unit decomposes the data received from the superior layer into packets so as to be transmitted. The packet transmitting/receiving unit also realizes the function of transferring the received packets to the superior layer.

PMIP processor 160 is a functional unit for establishing a transmission path (called PMIP tunnel) used between PGW 10 and SGW 20.

[1.2.2 SGW Configuration]

Figure 4:
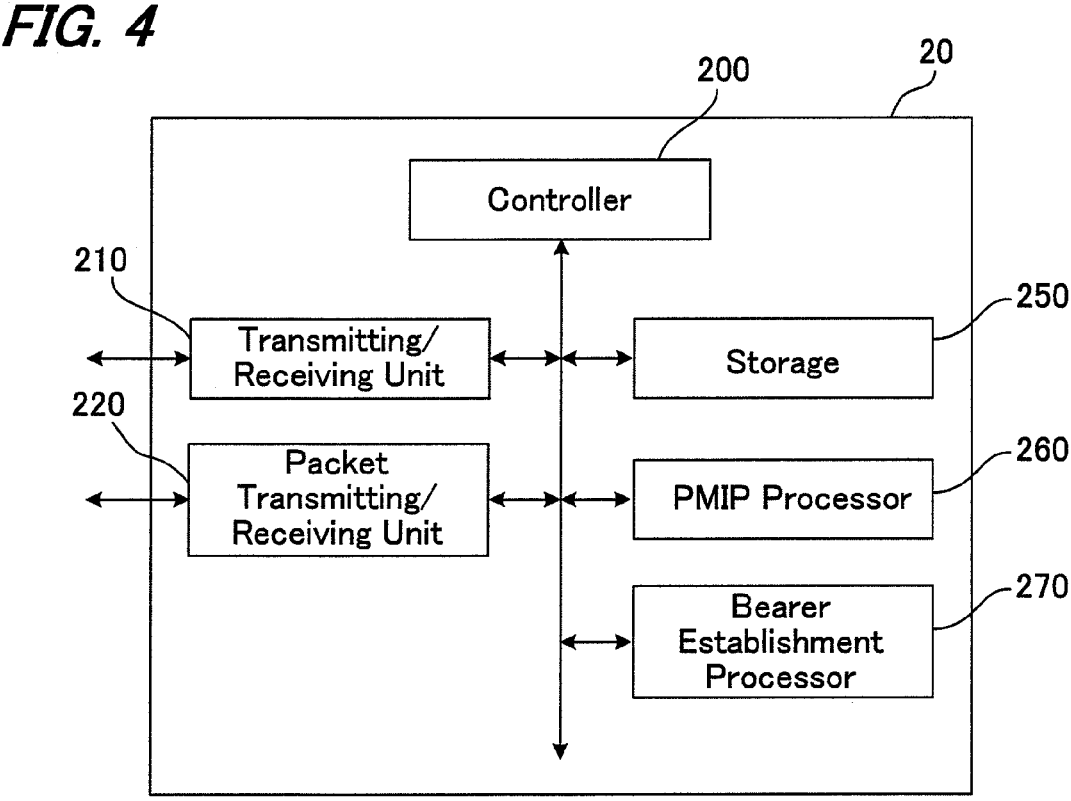
FIG. 4 is a block diagram of a SGW in the first embodiment.

Next, the configuration of SGW 20 in the present embodiment will be described. As shown in FIG. 4, SGW 20 includes a controller 200 to which a transmitting/receiving unit 210, a storage 250, a bearer establishment processor 270, a packet transmitting/receiving unit 220 and a PMIP processor 260 are connected by a bus.

Controller 200 is a functional unit for controlling SGW 20. The controller 200 reads out and runs various programs stored in storage 250 to thereby realize various processes.

Transmitting/receiving unit 210 is a functional unit that is wire-connected to a router or a switch to perform transmission and reception of packets. Transmission and reception of packets is performed through, for example, Ethernet (registered trademark), which is generally used as a network connecting standard, or the like.

Storage 250 is a functional unit that stores programs, data and the like necessary for various operations of SGW 20.

Bearer establishment processor 270 is a functional unit that implements a process for establishing an EPS bearer.

Packet transmitting/receiving unit 220 is a functional unit for transmitting and receiving specific data (packets). The packet transmitting/receiving unit decomposes the data received from the superior layer into packets so as to be transmitted. The packet transmitting/receiving unit also realizes the function of transferring the received packets to the superior layer.

PMIP processor 260 is a functional unit for establishing a PMIP tunnel in between PMIP processor 260 and PGW10.

[1.2.3 HSS Configuration]

Figure 5:
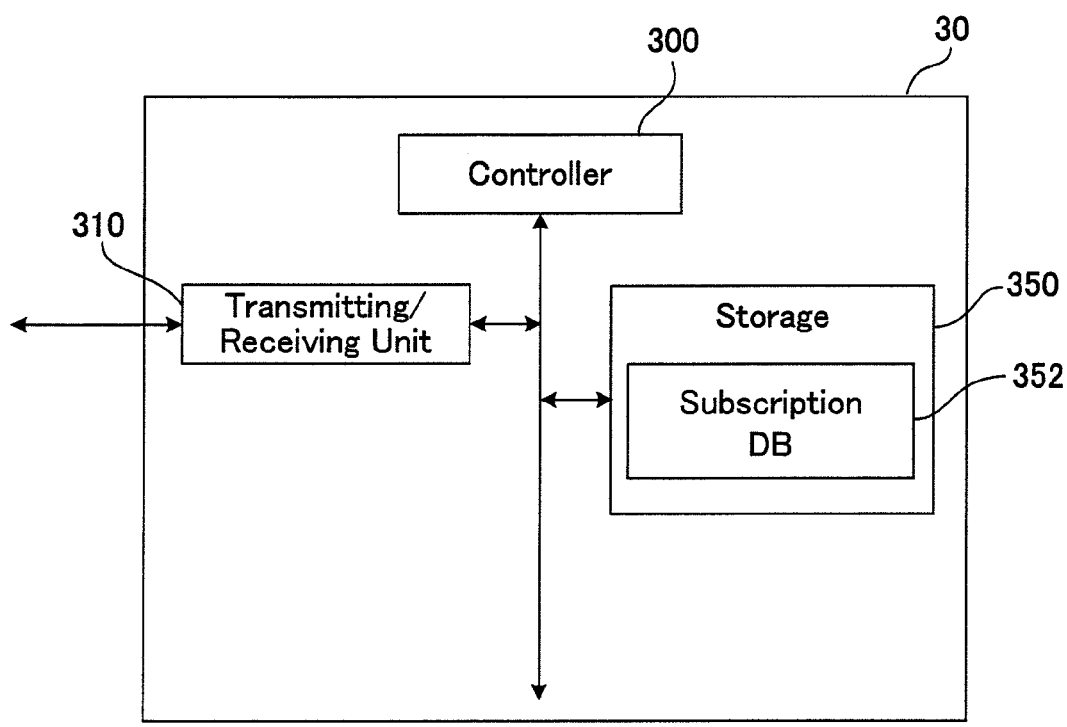
FIG. 5 is a block diagram of a HSS in the first embodiment.

Next, the configuration of HSS 30 in the present embodiment will be described. As shown in FIG. 5, HSS 30 includes a controller 300 to which a transmitting/receiving unit 310 and a storage 350 are connected by a bus.

Controller 300 is a functional unit for controlling HSS 30. The controller 300 reads out and runs various programs stored in storage 350 to thereby realize various processes.

Transmitting/receiving unit 310 is a functional unit that is wire-connected to a router or a switch to perform transmission and reception of packets. Transmission and reception of packets is performed through, for example, Ethernet (registered trademark), which is generally used as a network connecting standard, or the like.

Storage 350 is a functional unit that stores programs, data and the like necessary for various operations of HSS 30. The storage 350 further stores a subscription DB (database) 352 that holds subscriber information.

Figures 6, 7:
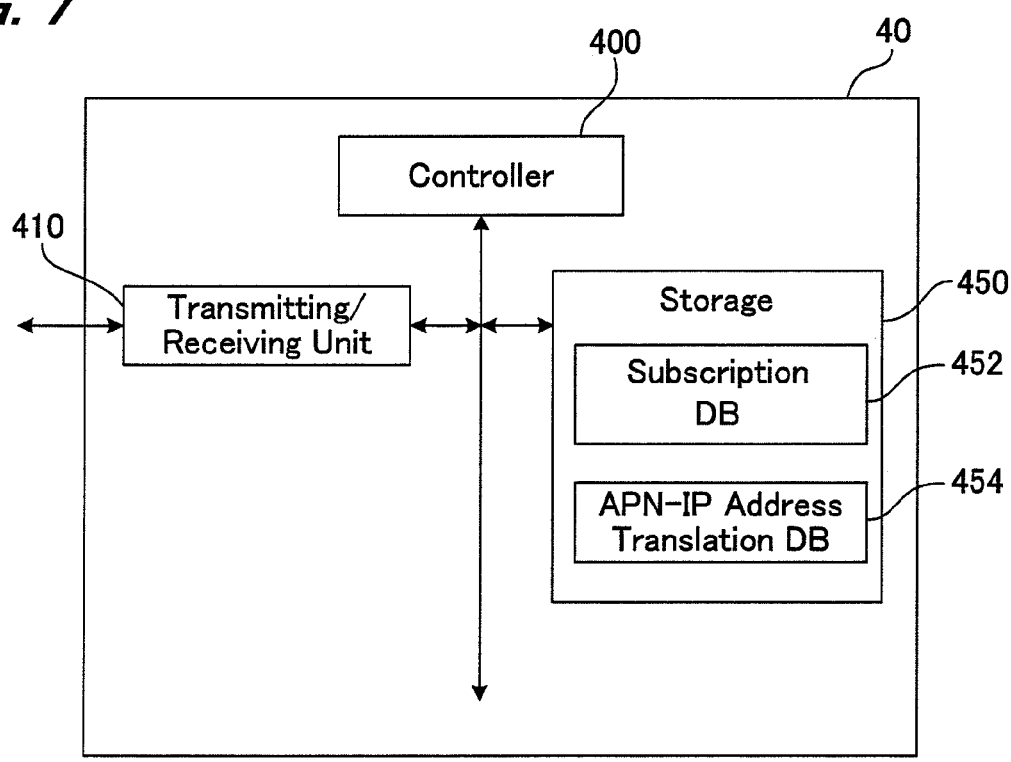
FIG. 6 is a chart showing one example of a subscription DB of the HSS in the first embodiment.
FIG. 7 is a block diagram of an MME in the first embodiment.

Here, FIG. 6 shows one example of subscription DB 352. Subscription DB 352 records, for UEs managed by mobile communication system 1, the UE's identifier (e.g., "UE1" generated from IMSI (International Mobile Subscriber Identify: subscriber identification information) and the like), the CSGID (e.g., "CSGID2") representing the group identifier allotted to home base station 60 which the UE is allowed to access, and either "allowed" or "disallowed", i.e., the status of the availability of service (e.g., "class 1: internet connection service" and "class 2: home network connection service") through the local IP access.

Further, it is assumed that the owner of home base station 60 or the operator of mobile communication system 1 can access subscription DB 352 and to which UE what kind of access right information is provided for every CSGID that is allotted to owned home base station 60.

Controller 300 offers information from subscription DB 352 stored in storage 350, in response to a request from MME 40.

[1.2.4 MME Configuration]

Next, the configuration of MME 40 in the present embodiment will be described. As shown in FIG. 7, MME 40 is connected with a transmitting/receiving unit 410 and a storage 450 by a bus.

Controller 400 is a functional unit for controlling MME 40. The controller 400 reads out and runs various programs stored in storage 450 to thereby realize various processes.

Transmitting/receiving unit 410 is a functional unit that is wire-connected to a router or a switch to perform transmission and reception of packets. Transmission and reception of packets is performed through, for example, Ethernet (registered trademark), which is generally used as a network connecting standard, or the like.

Storage 450 is a functional unit that stores programs, data and the like necessary for various operations of MME 40. Storage 450 is further recorded with a subscription DB 452 for temporarily storing subscriber information and an APN-IP address translation DB 454.

Figures 8, 9, 10:
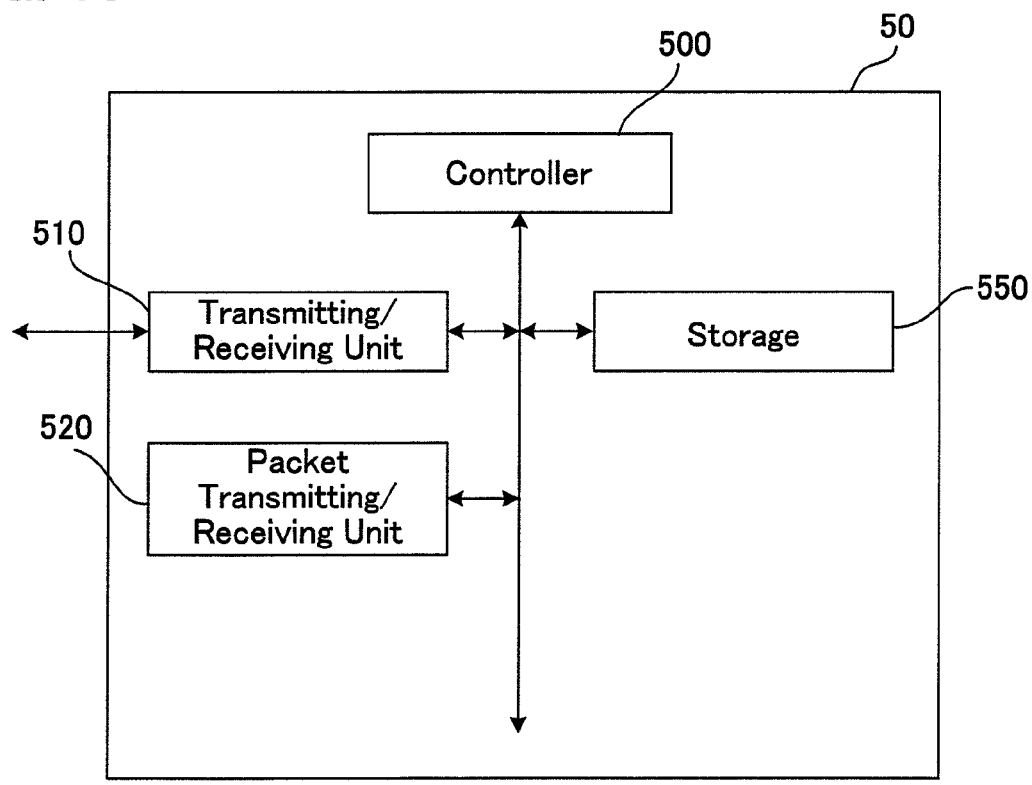
FIG. 8 is a chart showing one example of a subscription DB of the MME in the first embodiment.
FIG. 9 is a chart showing one example of an APN-IP address translation DB of the MME in the first embodiment.
FIG. 10 is a block diagram of a GW in the first embodiment.

FIG. 8 is a chart showing one example of subscription DB 452. The structure of the database is the same as that of subscription DB 352 held by HSS 30 as shown in FIG. 6. However, information on UEs to be managed by the MME 40 only is temporarily stored.

FIG. 9 is a chart showing one example of APN-IP address translation DB 454. As shown in FIG. 9, the database is one that holds a translation table relating an APN (e.g., "WEB") to the IP addresses of PGW 10 and SGW 20 (e.g., "2001: 200: 1::1" and "2001:200:2::1).

[1.2.5 GW Configuration]

Next, the configuration of GW 50 in the present embodiment will be described. As shown in FIG. 10, GW 50 includes a controller 500 to which a transmitting/receiving unit 510, a packet transmitting/receiving unit 520 and a storage 550 are connected by a bus.

Herein, communication between MME 40 and home base station 60 and between SGW 20 and home base station 60 is performed by way of GW 50.

Controller 500 is a functional unit for controlling GW 50. The controller 500 reads out and runs various programs stored in storage 550 to thereby realize various processes.

Transceiver 510 is a functional unit that is wire-connected to a router or a switch to perform transmission and reception of packets. Transmission and reception of packets is performed through, for example, Ethernet (registered trademark), which is generally used as a network connecting standard, or the like.

Packet transmitting/receiving unit 520 is a functional unit for transmitting and receiving specific data (packets). The packet transmitting/receiving unit decomposes the data received from the superior layer into packets so as to be transmitted. The packet transmitting/receiving unit also realizes the function of transferring the received packets to the superior layer. Storage 550 is a functional unit for storing programs, data and the like necessary for various operations of the GW.

[1.2.6 Home Base Station Configuration]

Figures 11, 12:
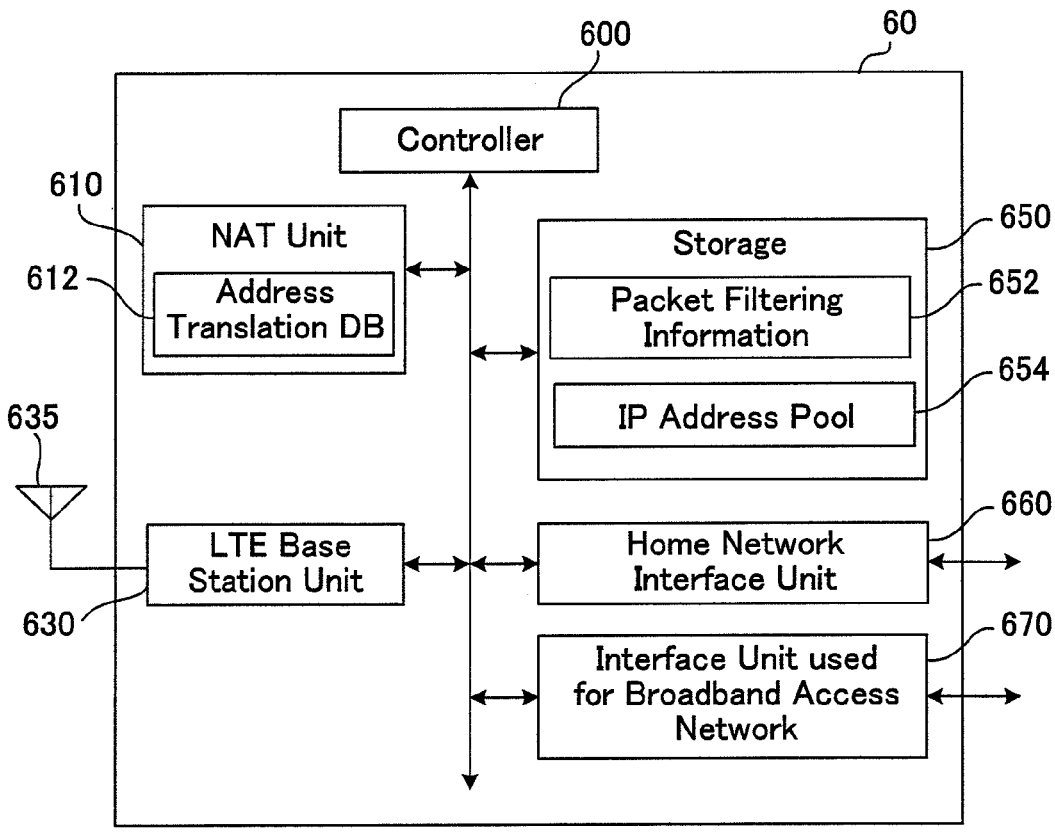
FIG. 11 is a block diagram showing a home base station in the first embodiment.
FIG. 12 is a chart showing one example of an address translation DB in the home base station in the first embodiment.

Next, the configuration of home base station 60 in the present embodiment will be described. FIG. 11 is a diagram for illustrating the configuration of home base station 60, and includes a controller 600, to which a NAT (Network Address Translation) unit 610, an LTE base station unit 630, a storage 650, a home network interface unit 660 and an interface unit 670 used for broadband access network are connected by a bus.

Controller 600 is a functional unit for controlling base station 60. The controller 600 reads out and runs various programs stored in storage 650 to thereby realize various processes.

NAT unit 610 receives a packet from LTE base station unit 630, alters the sender IP address and forwards the packet to home network interface unit 660 or interface unit 670 used for broadband access network, in accordance with the destination IP address.

Similarly, the NAT unit also receives a packet from home network interface unit 660 or interface unit 670 used for broadband access network, alters the destination address and forwards the packet to LTE base station unit 630.

Further, NAT 610 holds an address translation DB 612 as shown in FIG. 12. Here, address translation DB 612 records the identifier of UE 70 (UE1), pre-translation address of UE 70 (e.g., "UE1_HNP1" as the IP address prefix of UE 70) and the post-translation address of UE 70 (e.g., "2001:100: 200:4000::1) in a related manner.

LTE base station unit 630 is a functional unit that functions as an LTE base station to accommodate UE 70. LTE base station unit 630 has an external antenna 635 connected thereto.

Storage 650 is a functional unit that stores programs, data and the like necessary for various operations of home base station 60. The storage 650 further stores packet filtering information 652 and an IP address pool 654.

Figures 13, 14:
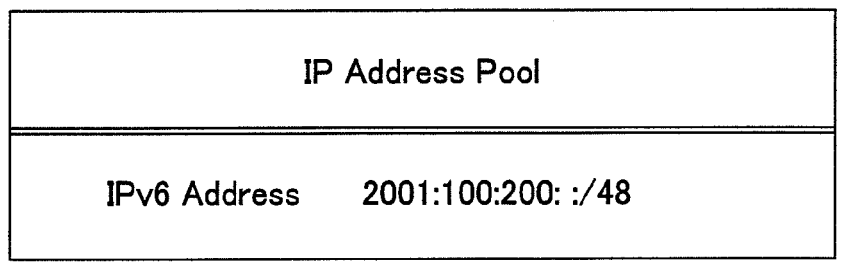
FIG. 13 is a chart showing one example of packet filtering information of the home base station in the first embodiment.
FIG. 14 is a chart showing one example of an IP address pool of the home base station in the first embodiment.

FIG. 13 is a table showing one example of packet filtering information 652. This information stores the rule that determines whether packet transfer by home base station 60 is allowed or not for every offered service class (e.g., "class 1: internet connection" and the like) when home base station 60 offers local IP access functionality.

It is assumed, for example that information terminal 80 connected to the home network is allotted with an IPv6 address beginning with "2001:100:200:3000".

For a case of class 1, transfer of all packets is allowed ("allow all"), then if the destination or sender IPv6 address of a packet begins with "2001:100:200:3000", transfer of the packet is disallowed ("disallow IPv6-2001:100:200:3000::/ 64"). That is, the packet filtering assigned to this class 1 is applied, so that communication from UE 70 to the home network and communication from the home network to UE 70 are shut out by home base station 60.

On the other hand, for a case of class 2, transfer of all packets is shut out ("disallow all"), then if the destination or sender IPv6 address of a packet begins with "2001:100:200: 3000", transfer of the packet is allowed ("allow IPv6-2001: 100:200:3000::/64"). As a result, only the communication between UE 70 and information terminal 80 inside the home network is allowed.

FIG. 14 is a table showing one example of IP address pool 654, and home base station 60 manages an IP address block (e.g., "2001:100:200::/48" or the like) assigned to home base station 60 by the operator offering broadband access service.

Then, it is assumed that home base station 60 gives assignment to UE 70 that uses local IP access from this IP address block, and that, for example IPv6 address prefix "2001:100:200:4000:/64" is allotted to UE 70. Here, it is assumed that routing information has been set up on the internet so that communication addressed to IP addresses belonging to this IP address block is routed to home base station 60.

Home network interface unit 660 is a functional unit that performs transmission and reception of packets with other apparatus inside the home network. Transmission and reception is performed through, for example, Ethernet (registered trademark), which is generally used as a network connecting standard, or the like.

Interface unit 670 used for broadband access network is a functional unit that performs transmission and reception of packets with the broadband access network. Transmission and reception is performed through, for example ADSL, which is generally used as a network connecting standard, or the like.

[1.2.7 UE Configuration]

Figure 15:
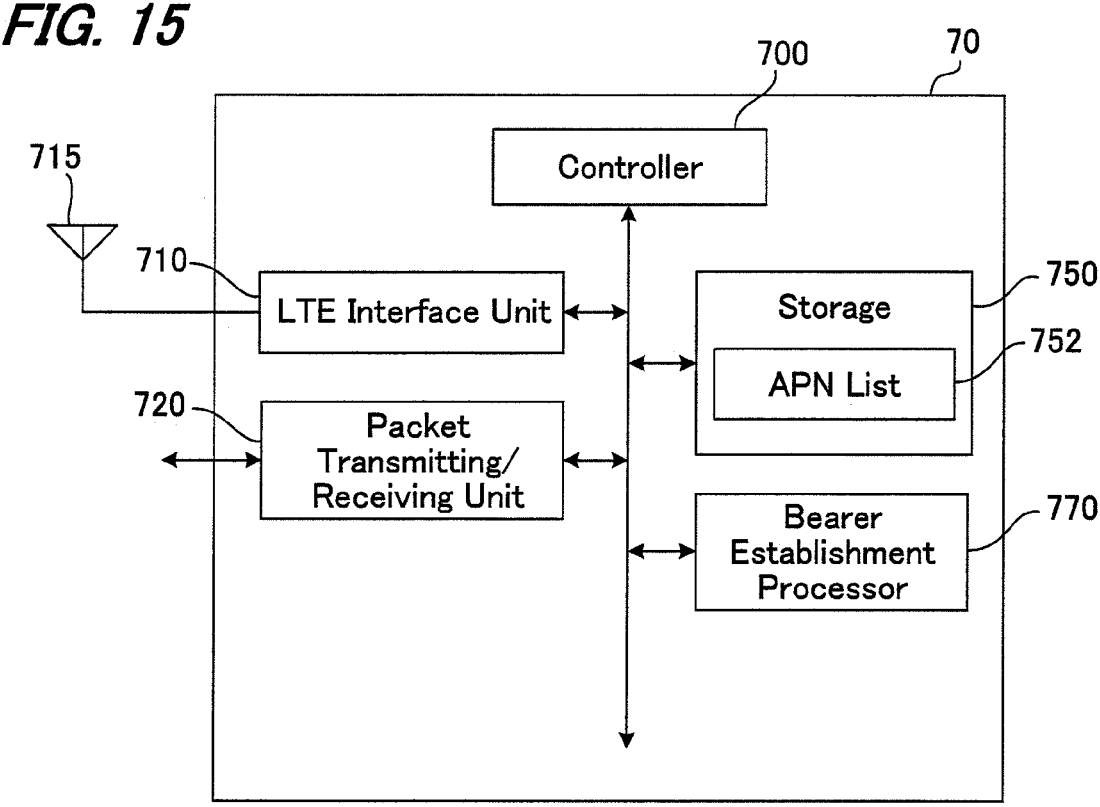
FIG. 15 is a block diagram of a UE in the first embodiment.

Next, the configuration of UE 70 as mobile station in the present embodiment will be described. As a specific example of UE 70, mobile terminals that connect to the mobile communication system via radio access interface, PDAs and other terminals are presumed. As shown in FIG. 15, controller 700 is connected with an LTE interface unit 710, a packet transmitting/receiving unit 720, a storage 750 and a bearer establishment processor 770 by a bus.

Controller 700 is a functional unit for controlling UE 70. The controller reads out and runs various programs stored in storage 750 to thereby realize various processes.

LTE interface unit 710 is a functional unit with which UE 70 connects to home base station 60. LTE interface unit 710 is connected with an external antenna 715.

Packet transmitting/receiving unit 720 is a functional unit for exchanging specific data (packets). The packet transmitting/receiving unit decomposes the data received from the superior layer into packets so as to be transmitted. The packet transmitting/receiving unit also realizes the function of transferring the received packets to the superior layer.

Storage 750 is a functional unit that stores programs, data and the like necessary for various operations of UE 70. Storage 750 also stores an APN list 752.

Figure 16:
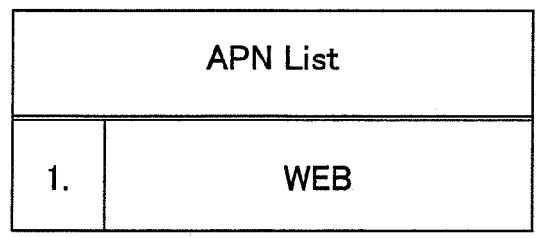
FIG. 16 is a chart showing one example of a UE's APN list in the first embodiment.

APN list 752 stores APN as candidates for UE 70 when UE 70 connects to the internet. FIG. 16 is a data configurational example of APN list 752. In APN list 752, APN as candidates that UE 70 may use are managed on a list as shown in FIG. 16.

Bearer establishment processor 770 is a functional unit that executes a process for establishing an EPS bearer as a communication path to SGW 20 inside the core network.

[1.2.8 Information Terminal Configuration]

Figure 17:
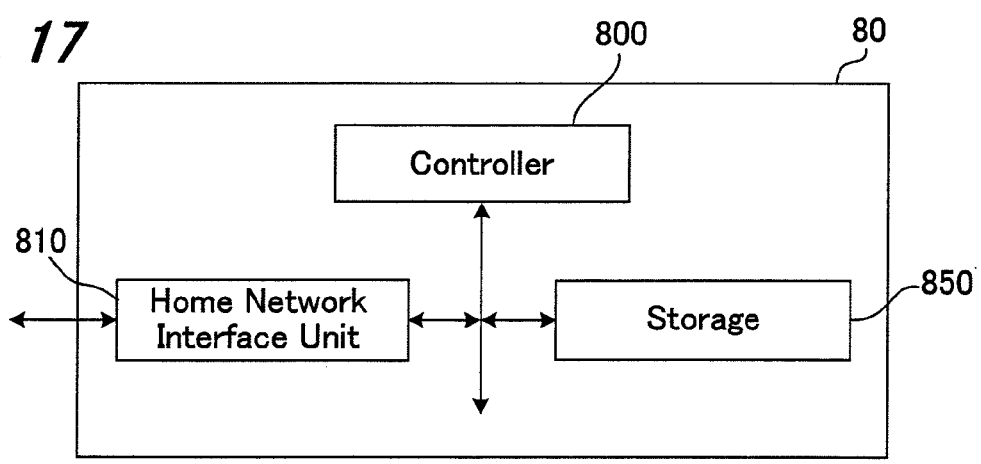
FIG. 17 is a block diagram of an information terminal in the first embodiment.

Next, the configuration of information terminal 80 in the present embodiment will be described. As shown in FIG. 17, information terminal 80 includes a controller 800 to which a home network interface unit 810 and a storage 850 are connected by a bus.

Controller 800 is a functional unit for controlling information terminal 80. The controller 800 reads out and runs various programs stored in storage 850 to thereby realize various processes.

Home network interface unit 810 is a functional unit for exchanging packets with other apparatus inside the home network. Transmission and reception of packets is performed through, for example, Ethernet (registered trademark), which is generally used as a network connecting standard, or the like.

Storage 850 is a functional unit that stores programs, data and the like necessary for various operations of information terminal 80.

[1.3 Description of Processing]

Next, the procedures for UE 70 to use the core network and local IP access via home base station 60 in mobile communication system 1 shown in FIG. 1 will be described with reference to the drawings.

[1.3.1 Home Base Station Registering Process]

Figure 18:
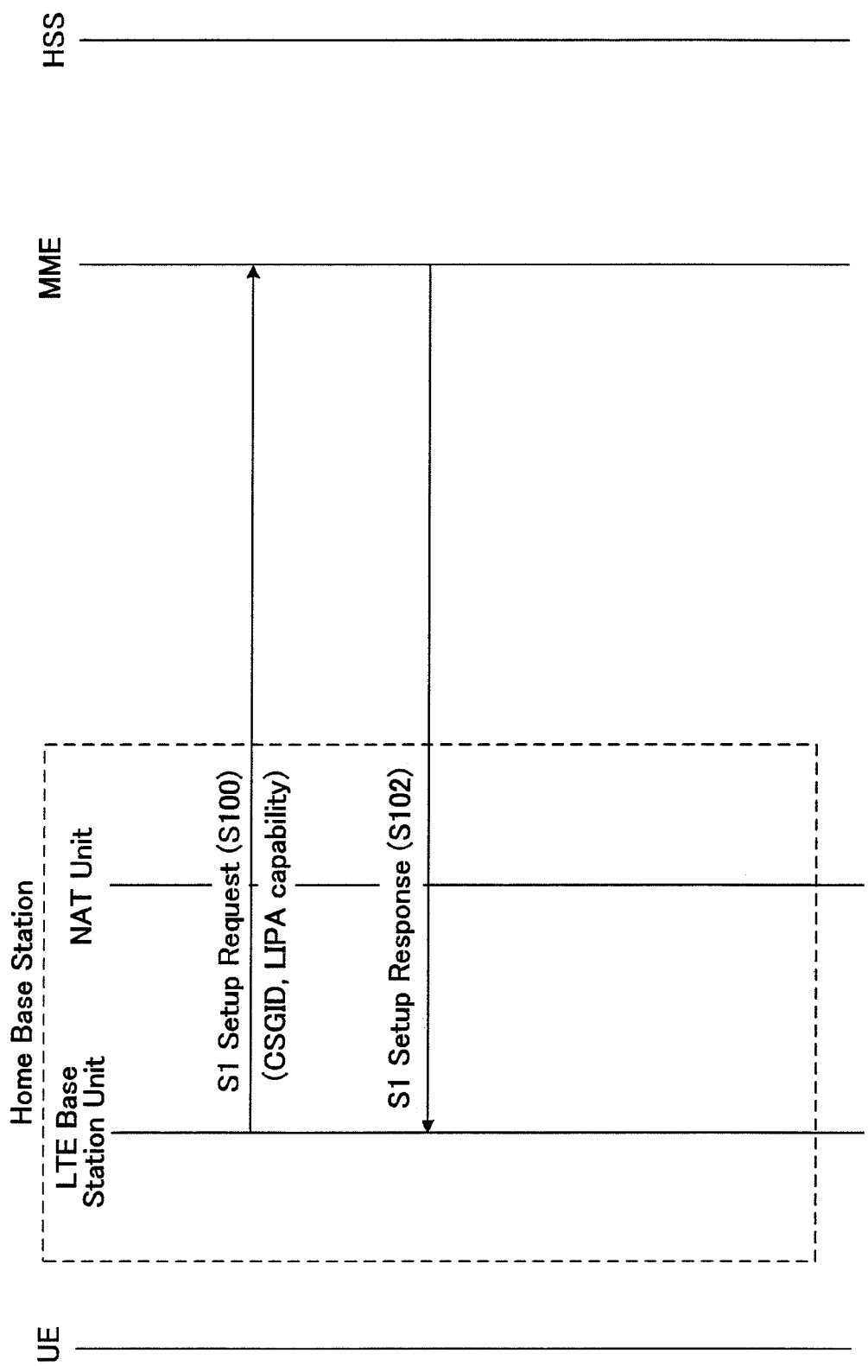
FIG. 18 is a diagram showing a sequence example of a registering process of the home base station in the first embodiment.

To begin with, the registering procedure of home base station 60 to mobile communication system 1 will be described using FIG. 18.

Home base station 60 transmits an S1 setup request to MME 40 (S100). Here, the S1 setup request is implemented to establish a communication path between LTE base station unit 630 of home base station 60 and MME 40 so that home base station 60 can operate as a base station of mobile communication system 1, and includes a CSGID assigned to home base station 60, and further includes LIPA (Local IP Access) Capability indicating that home base station 60 has local IP access functionality, differing from the conventional method. Then MME 40 transmits an S1 setup response (S102). In this way, the registering process of home base station 60 is completed.

[1.3.2 Process of UE Attachment to Home Base Station]

Figure 19:
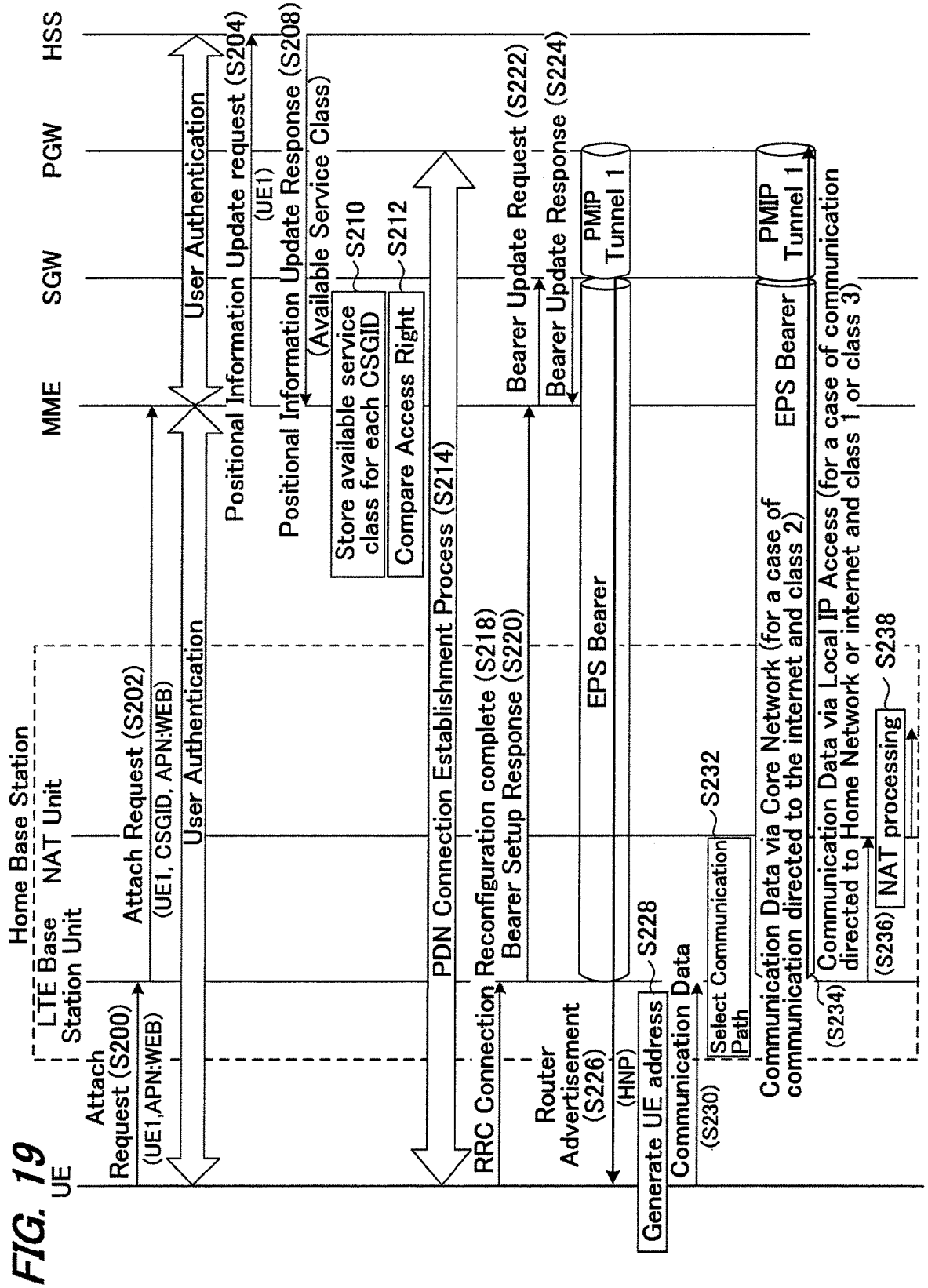
FIG. 19 is a diagram showing a sequence example of a UE's process of attachment to the home base station in the first embodiment.

Next, the procedure in which UE 70 connects to the core network via home base station 60 and is connected to a foreign PDN identified by the APN of "WEB", will be described using FIG. 19.

First, in order to connect to the core network via home base station 60, UE 70 transmits an attach request to home base station 60, following the configuration technique defined in non-patent document 1 (S200). The attach request includes a UE identifier (UE 1), an APN ("WEB") to identify the destination PDN, UE Capability that represents UE's retention function, and the like.

Home base station 60 transmits a CSGID of itself (named "CSGID 1", for example) together with the received attach request, to MME 40 (S202).

MME 40, following the prior art method, extracts the UE identifier included in the attach request to perform user authentication and further transmits a positional information update request to HSS 30 to acquire the subscription data of UE 70 (S204).

HSS 30 extracts only the information whose UE identifier corresponds to "UE1", from subscription DB 352 shown in FIG. 6, and transmits the extracted information by stuffing it in a positional information update response, to MME 40 (S208). Here, differing from the conventional method, not only the list of CSGIDs to which access right is being given, but available service for each CSGID is also transmitted.

Then, MME 40 stores the extracted information into subscription DB 452 of UE 70, as shown in FIG. 8 (S210).

Further, MME 40 compares CSGID (CSGID1) of home base station 60 to which UE 70 is connecting, with the acquired subscription data (S212). Thereby, whether or not UE 70 has access right to connect to home base station 60 is checked (S212). If the UE has no access right, MME 40 transmits a refusal of attachment, to UE 70 by way of home base station 60, and the attach process is ended as the attach process has been failed.

When the access right has been confirmed, MME 40 performs a PDN connection establishment process for UE 70 that has been allowed to connect (S214). The PDN connection is a logical path that is established between UE 70 and a PDN, is constructed of an EPS bearer established between home base station 60 and SGW 20 and a PMIP tunnel established between SGW 20 and PGW 10. The PDN connection establishment process is carried out between UE 70, home base station 60, MME 40, SGW 20 and PGW 10.

[1.3.3 PDN Connection Establishment Process]

Next, the PDN connection establishment process will be described with reference to FIG. 20.

First, MME 40 transmits a bearer setup request to SGW 20 (S400). The bearer setup request includes a UE identifier (UE1) and an APN.

SGW 20 receives the bearer setup request, and transmits a binding update request to PGW 10 in order to establish a PMIP tunnel between SGW 20 and PGW 10 (S402). The binding update request includes the UE identifier (UE1) and APN.

PGW 10 receives the binding update request, and allots an HNP to UE 70 first, to generate binding information 152 as shown in FIG. 3 (S404). Here, it is assumed that "UE1_HNP1" is allotted as the HNP.

Further, PGW 10 establishes PMIP tunnel 1 between PGW 10 and SGW 20 and performs such routing so as to forward to SGW 20 via PMIP tunnel 1 when receiving communication data directed to the HNP allotted for UE 70 (S406). Then, PGW 10 returns a binding update response to SGW 20 (S408). This message includes the allotted HNP.

SGW 20 having received the binding update response transmits a bearer setup response to MME 40 (S410). Here, the bearer setup response includes the HNP.

MME 40 receives the bearer setup response, and refers to the subscription data corresponding to UE 70, stored in subscription DB 452 to check whether access right to local IP access is present or not (S411).

[1.3.3.1 Access Right Determining Process]

Figure 21:
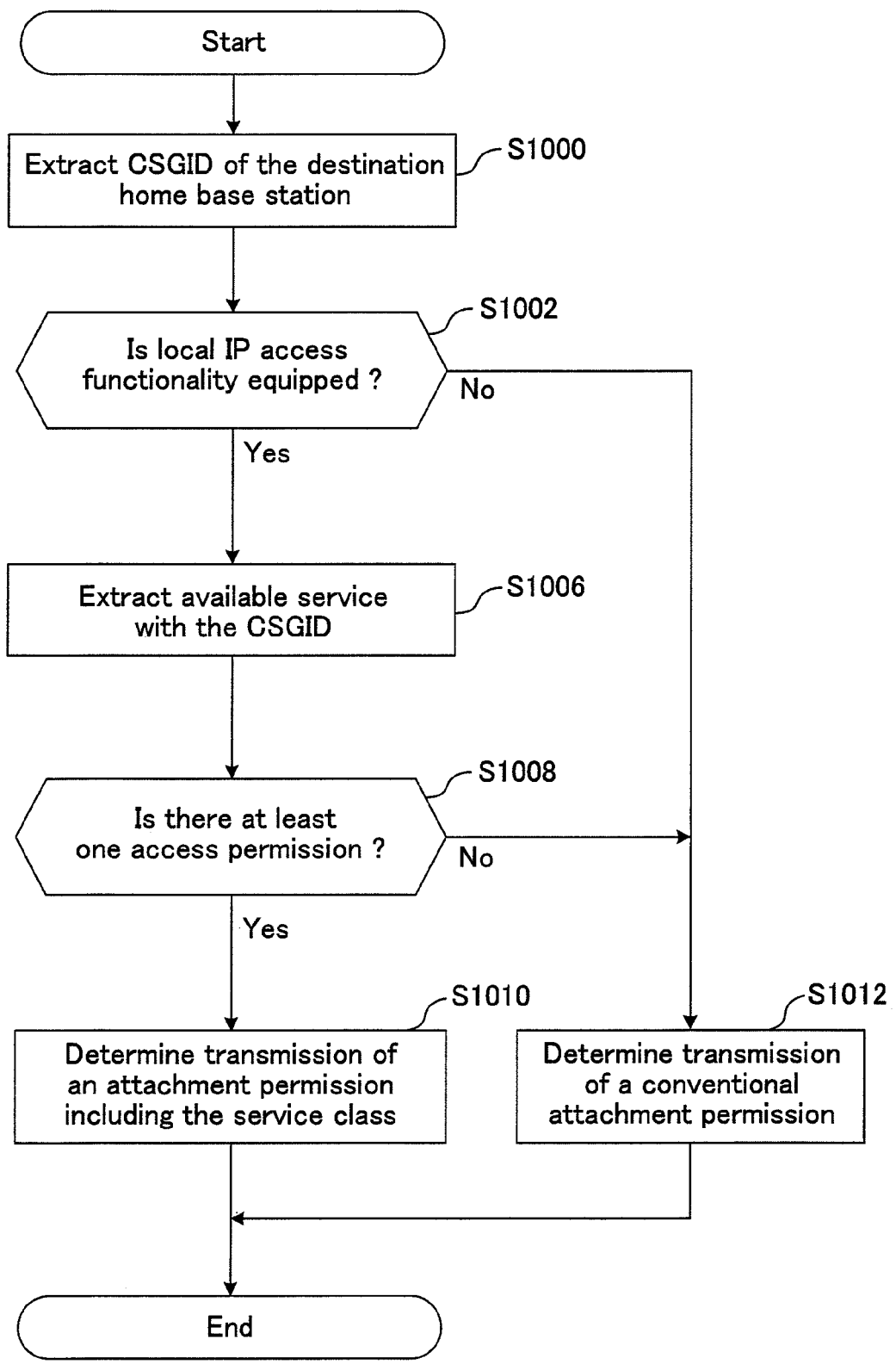
FIG. 21 is a diagram showing a flow chart of MME's access right determining process in the first embodiment.

Now, the process of determining access right will be described using a flow chart shown in FIG. 21.

First, the CSGID of the destination home base station 60 to which UE 70 is being connected is extracted (Step S1000). Then, the extracted CSGID (CSGID1) of home base station 60 is checked whether an S1 setup request was implemented as the home base station having local IP access functionality, at Step S100 for the registering process of the home base station (Step S1002). Here, when the S1 setup request has been implemented as not having local IP access functionality (Step S1002; No), it is determined that an attachment permission similar to the conventional method is to be transmitted to LTE base station unit 630, and the access right determining process is ended (Step S1012).

On the other hand, when an S1 setup request has been implemented as having local IP access functionality (Step S1002; Yes), the service available with the CSGID is extracted from subscription DB 452 (Step S1006). At this point, if access right has been given to at least one of the services (Step S1008; Yes), differing from the conventional method it is determined that an attachment permission including the service class to be described next is transmitted to LTE base station unit 630 (Step S1010). If no access right has been given to any service class (Step S1008; No), MME 40 determines that an attachment permission similar to the conventional method is transmitted to LTE base station unit 630, and the access right determining process is ended (Step S1012). In this case, it is assumed that UE 70 cannot use local IP access.

The service class to be included in the attachment permission at Step S1010 should include any one of the following information, based on the access right information held in subscription DB 452.

Class 1: capable of using internet connection;
Class 2: capable of using home network connection; and
Class 3: capable of using internet connection and home network connection.

If, for example, only the connection to the home network is allowed, "Class 2" is stored as the service class.

[1.3.3.2 Communication Path Setup Process]

Next, returning to FIG. 20 once again, the following process will be described.

After S411, based on the access right determining process, MME 40 transmits an attachment permission to LTE base station unit 630 (S412). The attachment permission includes an APN and the service class based on the result of the determining process. However, when no access right is given to any service based on the result of the determining process, the permission does not include any service class.

LTE base station unit 630 receives the attachment permission, and refers to packet filtering information 652 of FIG. 13, based on the service class if the service class is included, and implements a communication path setup process to be described next (S416). Then, whether each communication data packet transmitted and received by home base station 60 is forwarded or not is determined based on this communication path setup process.

Figure 22:
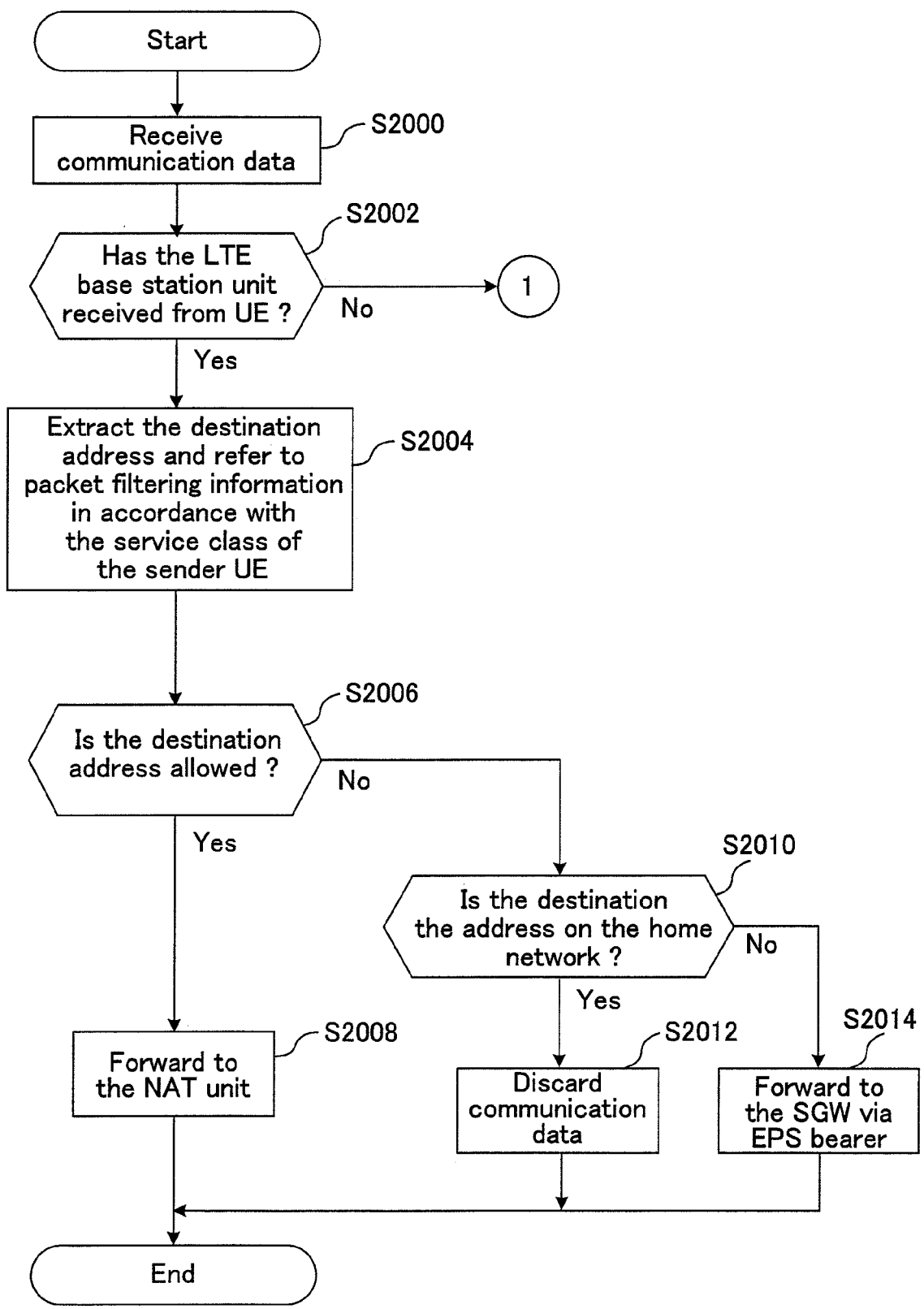
FIG. 22 is a diagram showing a flow chart of a communication path setup process at the home base station in the first embodiment.
Figure 23:
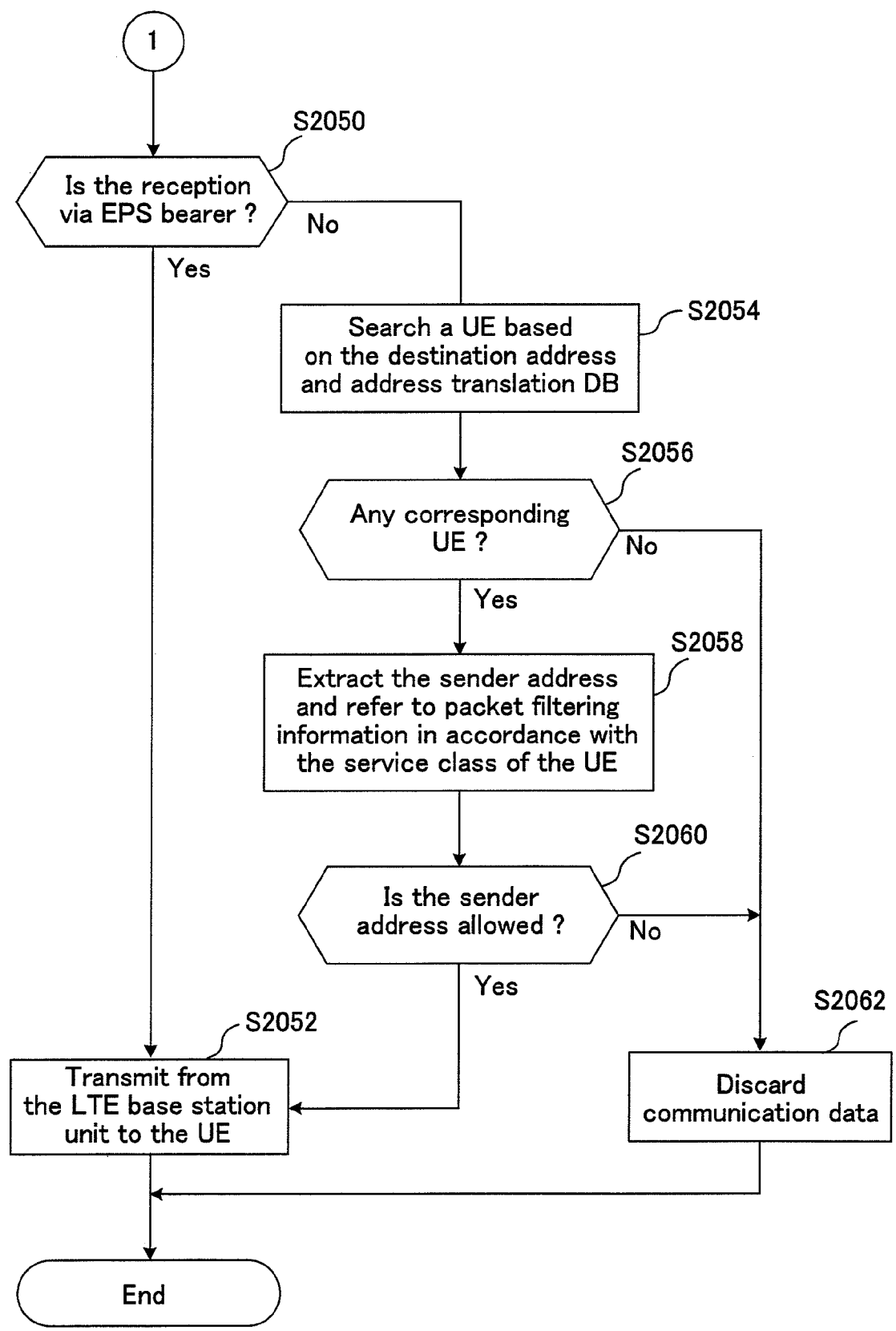
FIG. 23 is a diagram showing a flow chart of a communication path setup process at the home base station in the first embodiment.

FIGS. 22 and 23 show a flowchart of the communication path setup process, which will be described hereinbelow.

First, LTE base station unit 630 receives communication data (Step S2000) and determines whether the communication data has been received from UE 70 that is connecting to home base station 60 (Step S2002).

Herein, if the communication data is one that is received from UE 70 (Step S2002; Yes), the destination address is extracted so as to refer to packet filtering information 652, in accordance with the service class of UE 70 (Step S2004). Then, it is determined whether the destination address is one that is allowed or not (Step S2006).

If it was determined at Step S2006 that the destination address is one that is allowed (Step S2006; Yes), the communication data is forwarded to NAT unit 610 (S2008), and this process is ended.

On the other hand, if it was determined at Step S2006 that the destination address is one that is not allowed (Step S2006; No), it is further determined whether or not the destination address is one that is directed to the home network (Step S2010). At this point, if the destination is the address that is directed to the home address (Step S2010; Yes), the received communication data is discarded (Step S1012). If otherwise, the received data is forwarded to SGW 20 through the EPS bearer (S2014), and this process is ended.

When, at Step S2002, the reception at LTE base station unit 630 is not from UE 70 (Step S2002; No), it is determined whether or not the reception is by way of the EPS bearer (Step S2050 in FIG. 23). Then, if it is determined that the reception is by way of the EPS bearer (Step S2050; Yes), the received communication data is transmitted to UE 70 using LTE base station unit 630 (Step S2052), and this process is ended.

On the other hand, if it is determined at Step S2050 that the reception is not obtained by way of the EPS bearer (Step S2050; No), UE 70 is searched based on the destination address and the pre-translation address in address translation DB 612 (Step S2054). Then, it is determined whether or not the corresponding UE is included in address translation DB 612 (Step S2056).

At this point, when the corresponding UE is included in address translation DB 612 (Step S2056; Yes), the sender address is extracted so as to refer to packet filtering information 652, in accordance with the service class of the UE (Step S2058). Then, it is determined whether the sender address is one that is allowed (Step S2060). When the sender address is an allowed one (Step S2060; Yes), the communication data is transmitted to UE70, using LTE base station unit 630 (Step S2052), and this process is ended.

When it is determined that the UE is not included at Step S2056 (Step S2056; No), or when the sender address is not an allowed one at Step S2060 (Step S2060; No), the received communication data is discarded and the process is ended (Step S2062).

Figure 20:
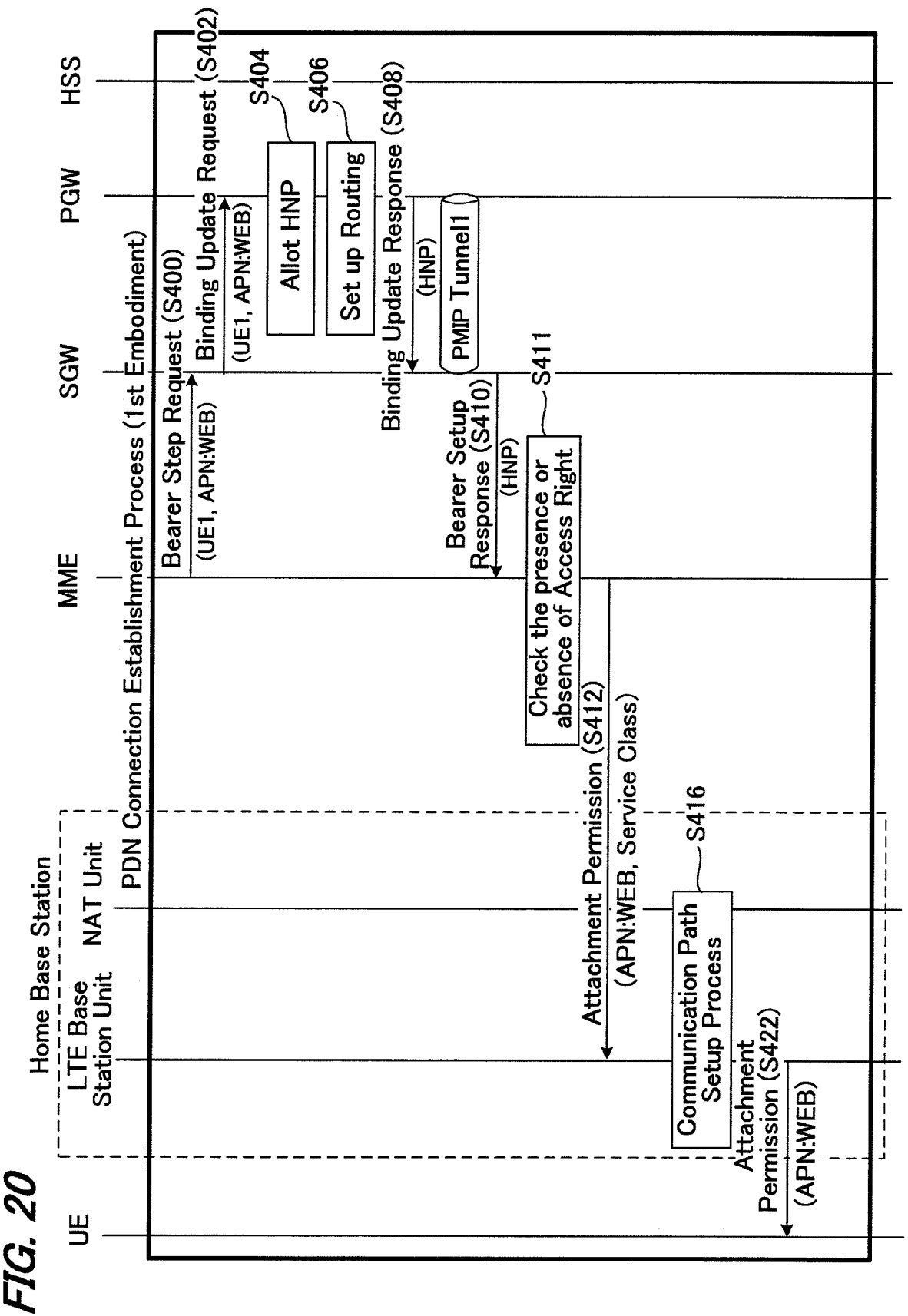
FIG. 20 is a diagram showing a sequence example of a UE's PDN connection establishment process in the first embodiment.

Further, after setup of a communication path is completed in this communication path setup process, LTE base station unit 630 transmits an attachment permission to UE 70 (S422 in FIG. 20). Here, the attachment permission includes an APN and does not include the service class. By the above procedure, the PDN connection establishment process is completed.

[1.3.4 EPS Bearer Establishment Process]

Next, returning to FIG. 19 once again, the following process will be described.

After the PDN connection establishment process (S241), UE 70 transmits an RRC connection re-setting up complete message to LTE base station unit 630 (S218).

Then, LTE base station unit 630 transmits a bearer setup response to MME 40 (S220). MME 40 receives the bearer setup response and transmits a bearer update request including the IP address of home base station 60 to SGW 20 (S222).

SGW 20 transmits a bearer update response to MME 40 (S224), and acquires the IP address of home base station 60 to establish an EPS bearer.

Then, SGW 20 transmits a router advertisement stored with the HNP acquired from the PDN connection establishment process, to UE 70 (S226).

UE 70 takes out the HNP from the received router advertisement and generates an IPv6 address of itself using the HNP (S228).

By the above procedure, UE 70 completes EPS bearer establishment and forms such a state that transmission and reception of communication data using PMIP tunnel 1 and the EPS bearer is enabled.

[1.3.5 Transmission and Reception Processes of UE's Communication Data]

When connecting to the internet by means of an application such as a WEB browser etc., or making use of home network connection service, UE 70 transmits communication data to LTE base station unit 630 first (S230).

LTE base station unit 630 having the received communication data from UE 70, selects a communication path for the received communication data, based on the above-described communication path setup process (Step S232). Then, when it has been determined based on the determination of the communication path setup process that communication data is forwarded to the SGW via the EPS bearer, the communication data is transferred via the EPS bearer and PMIP tunnel 1 and sent out to a foreign PDN (S234).

When, based on the determination of the communication path setup process UE 70 uses local IP access (S236) or it has been determined that communication data is transferred to NAT unit 610, NAT unit 610 implements a NAT process of altering the sender address of the communication data based on the address translation DB 612 (S238). Then, if the destination address is an address on the home network, the communication data is transmitted using home network interface unit 660. If otherwise, the communication data is transmitted using interface unit 670 used for broadband access network.

If UE 70, defying the access right information, transmits communication data to the home network despite that the home network connection service via local IP access is not available, the communication data is discarded by the above-described communication path setup process at LTE base station unit 630.

In this way, in the present embodiment, for the service using the local IP access functionality of the home base station, the owner of the home base station and the mobile network operator can set up the access right of each UE for each service, hence it is possible to realize various usage scenarios of the home base station.

Further, the home base station can perform packet filtering based on the service class for which access right is given to a UE. Even if a UE that is not allowed to use home network connection service via local IP access, has transmitted communication data directed to the home network, intentionally or by mistake, the home base station can detect and discard the communication data. Further, the communication data directed in reverse is also packet filtered in accordance with the access right.

Further, when the UE has transmitted communication data directed to the internet, the home base station determines whether the transmission should be performed via local IP access or via the core network, based on the access right of the UE, so that no change in functionality is needed for the UE to perform communication path selection.

Moreover, the MME stuffs the service class into the attachment permission to notify the home base station of the access right as to local IP access so as to perform access control of a UE in accordance with that notified right. With this arrangement, the home base station does not need to retain access right information for each UE.

Furthermore, the group identifier of an accessible home base station and access right information on local IP access for every UE are integrally managed in the subscriber information management apparatus, so that this information is used for access control at the home base station. With this arrangement, it becomes possible for the owner of the home base station and the mobile network operator to easily set up and manage access right information.

Although the present embodiment was described taking an example of establishing a PMIP tunnel by using a binding update request and a binding update response between PGW 10 and SGW 20, the invention should not be limited to this. It is possible to use a method of establishing a transmission path that is equivalent to a PMIP tunnel by establishing a GTP (GPRS Tunneling Protocol) tunnel using a bearer establishment request and a bearer establishment response, instead.

Further, though the present embodiment was described taking an example of a case where home base station 60 also includes as its constituent a gateway to a broadband access network, the present invention should not be limited to this. It is also possible to configure the interface unit 670 used for broadband access network of home base station 60 and home network interface unit 660 alone as a separate apparatus (which will be referred to hereinbelow as home gateway) while home base station 60 may include controller 600 to which NAT unit 610, LTE base station unit 630, storage 650 and home network interface unit 660 are connected by a bus. In this case, it is understood that home base station 60, the home gateway and information terminal 80 are mutually connected via the home network interface.

Further, though the present invention was described taking an example of a case where a UE performs communication using IPv6, a similar procedure can be carried out in a case using IPv4 addresses. However, IPv4 global addresses are running out, so that it is expected to be difficult for an operator of offering broadband access service to assign a large number of IPv4 address blocks to individual home base stations. In this case, when internet connection through local IP access is used, it is presumed that address translation based on NAT (Network Address Translation) is used. First, private address space such as 192.168.0.0/16 may be managed in the IP address pool inside the home base station so as to allot IPv4 addresses to the UEs connecting to the home base station with Pv4 addresses having a different subnet in the order of "192.168.1.1/net mask 255.255.255.0", "192.168.2.1/net mask 255.255.255.0", "192.168.n.1/net mask 255.255.255.0" (n is 3 to 255), for example.

Further, though the present invention was described taking an example of a case where home base station 60 is connected to SGW 20 and MME 40 by way of GW 50, the invention should not be limited to this; home base station 60 may be directly connected to SGW 20 and MME 40.

2. The Second Embodiment

Next, the second embodiment of the present invention will be described. This embodiment has the same network configuration and apparatus configuration as those of the first embodiment, except for the configuration of home base station 60, so that detailed description of the other configurations than that of home base station 60 is omitted.

[2.1 Apparatus Configuration]

First, each apparatus configuration will be briefly described with reference to the drawings.

[2.2.1 Home Base Station]

Figures 24, 25:
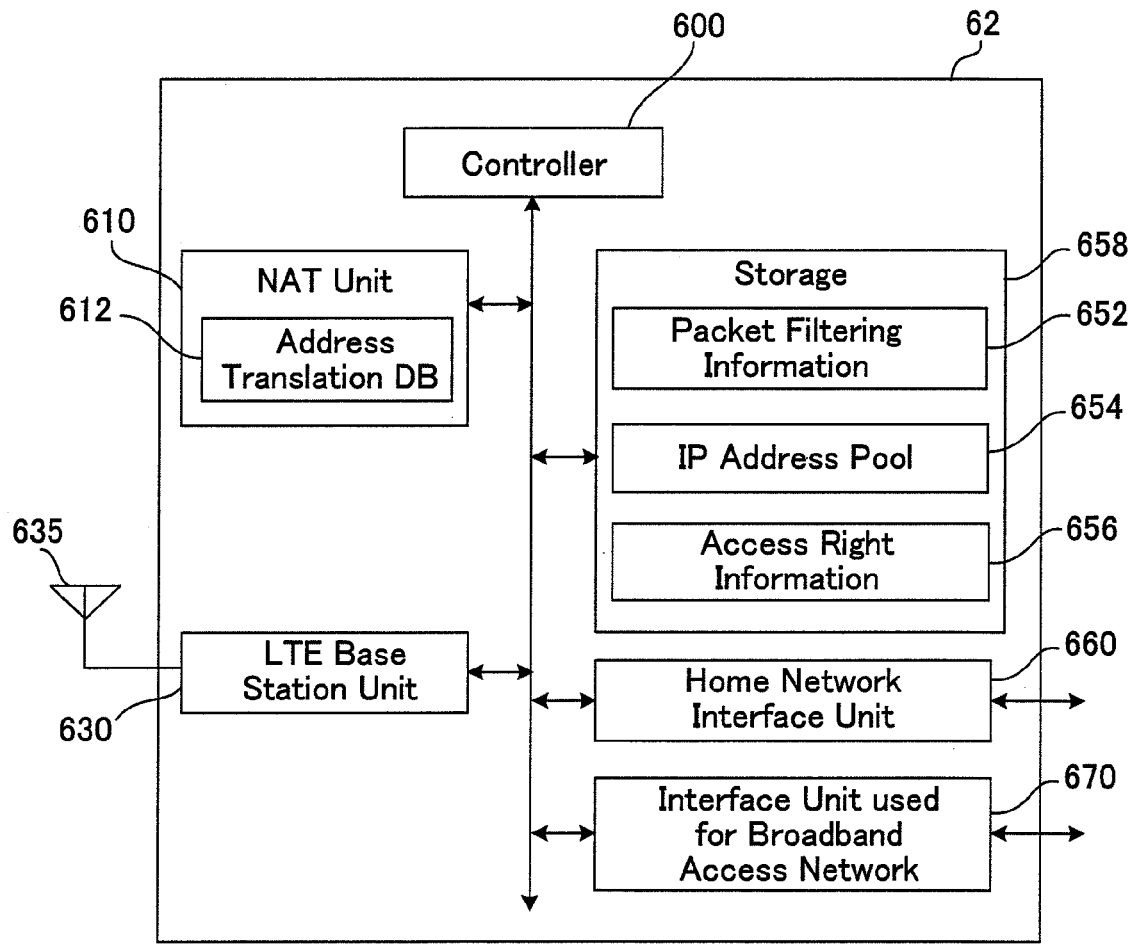
FIG. 24 is a block diagram showing the home base station in the second embodiment.
FIG. 25 is a chart showing one example of access right information at the home base station in the second embodiment.

The configuration of a home base station 62 in the present embodiment will be described. FIG. 24 is a diagram showing one example of the configuration of home base station 62, which is different from the configuration of home base station 60 in the first embodiment in that access right information 656 is recorded in a storage 658 (650).

FIG. 25 is a diagram showing one example of access right information 656, which shows a UE identifier (e.g., "UE1") and available service (e.g., "class 1; internet connection disallowed", "class 2: home network connection allowed", and the like) for every UE that comes to connect to home base station 62.

It is assumed that the owner of home base station 62 can modify this access right information 656, e.g., add new information of another UE, modify the available service for a particular UE.

Here, it is assumed that when information is added or modified, the information is synchronized with that written in subscription DB 352 of HSS 30 shown in FIG. 6. As an information synchronizing means, when, for example, any change in access right information takes place, home base station 62 may give notice to HSS 30, or subscription DB 352 of HSS 30 may be changed first, then HSS 30 may give notice to home base station 62.

The other configurations are the same as home base station 60 of the first embodiment described with FIG. 11, so that detailed description is omitted.

[2.2 Description of Processing]

First, similarly to the first embodiment, home base station 62 performs a procedure of registration to mobile communication system 1. The registering procedure is the same as that in the first embodiment so that description is omitted.

UE 70 next performs an attach process via home base station 62. The difference from the first embodiment herein resides in the PDN connection establishment process. Next, the PDN connection establishment process of the present embodiment will be described.

[2.2.1 PDN Connection Establishment Process]

Figure 26:
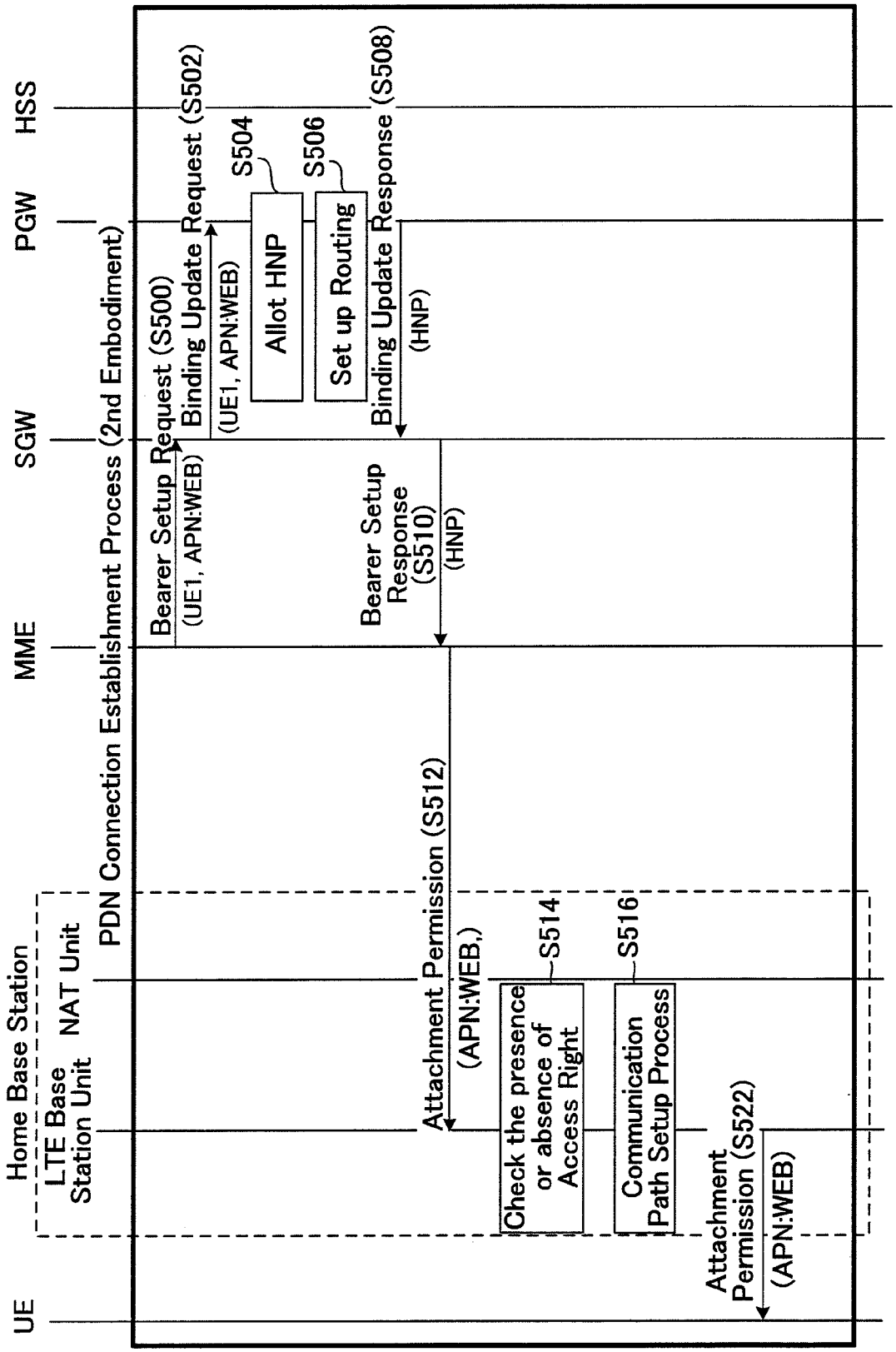
FIG. 26 is a diagram showing a sequence example of a UE's PDN connection establishment process in the second embodiment.

FIG. 26 shows a PDN connection establishment process.

First, MME 40 transmits a bearer setup request to SGW 20 (S500). The bearer setup request includes a UE identifier (UE1) and an APN.

SGW 20 receives the bearer setup request, and transmits a binding update request to PGW 10 in order to establish a PMIP tunnel between SGW 20 and PGW 10 (S502). The binding update request includes the UE identifier (UE1) and APN.

PGW 10 receives the binding update request, and allots an HNP to UE 70 first, to generate binding information as shown in FIG. 3 (S504).

Further, PGW 10 establishes PMIP tunnel 1 between PGW 10 and SGW 20 and performs such routing so as to forward to SGW 20 via PMIP tunnel 1 when receiving communication data directed to the HNP allotted for UE 70 (S506). Then, PGW 10 returns a binding update response to SGW 20 (S508). This message includes the allotted HNP.

SGW 20 having received the binding update response transmits a bearer setup response to MME 40 (S510). Here, the bearer setup response includes the HNP.

Then, MME 40 receives the bearer setup response. Differing from the first embodiment, the MME, not determining whether the access right to local IP access is present or not, transmits an attachment permission including an APN alone to LTE base station unit 630 (S512).

LTE base station unit 630 receives the attachment permission and checks whether UE 70 has access right to local IP access or not (S514). The determining process implemented herein is the same as the access right determining process, illustrated in FIG. 21, performed by the MME 40 in the first embodiment, except in that the process is performed based on access right information 656 held by home base station 62, instead of referring to subscription DB 452 of MME 40.

Further, LTE base station unit 630 implements a communication path setup process, based on the service class based on the access right of UE 70 and packet filtering information 652, to determine whether each of communication data can be forwarded or not (S516).

The communication path setup process is also the same as that in the first embodiment, except in that the process is implemented based on access right information 656 stored in home base station 62.

After completion of setting up the communication path, LTE base station unit 630 transmits an attachment permission to UE 70 (S522). From the above process, the PDN connection establishment procedure is completed.

The processing afterwards is the same as that in the first embodiment, so that description is omitted.

In this way, according to the second embodiment, since the home base station as well as HSS holds access right information on each UE, it is no longer necessary to add the service class as an extra step when the MME transmits the attachment permission to the LTE base station unit, it is hence possible to minimize addition of functionality to the MME.

As the embodiments of this invention have been detailed heretofore with reference to the drawings, the specific configuration should not be limited to the embodied modes. Designs and others that do not depart from the gist of this invention should also be included in the scope of claims.

As stated above, the present embodiment can be described as follows.

A mobile communication system of the present embodiment is a mobile communication system in which a home network having a home base station to which a mobile terminal is connected and a core network to which a subscriber information management apparatus, a position management apparatus and an access control apparatus are connected, are connected via a foreign network, wherein the subscriber information management apparatus includes: a subscription storage that stores, as subscription information, a group identifier for identifying a home base station and a service class available for the mobile terminal, in correspondence with a mobile terminal identifier for identifying the mobile terminal; a positional information update request receiver for receiving a positional information update request of the mobile terminal from the position management apparatus; and, a positional information response transmitter that extracts a service class corresponding to a mobile terminal identifier included in the positional information update request, from the subscription storage and transmits a positional information update response included with the extracted service class to the position management apparatus.

A subscriber information management apparatus of the present embodiment is a subscriber information management apparatus included in a mobile communication system in which a home network having a home base station to which a mobile terminal is connected and a core network to which the subscriber information management apparatus, a position management apparatus and an access control apparatus are connected, are connected via a foreign network, comprising: a subscription storage that stores, as subscription information, a group identifier for identifying a home base station and a service class available for a mobile terminal via a home base station, in correspondence with a mobile terminal identifier for identifying the mobile terminal; a positional information update request receiver for receiving a positional information update request of the mobile terminal from a position management apparatus; and, a positional information response transmitter that extracts the service class corresponding to the mobile terminal identifier included in the positional information update request, from the subscription storage and transmits a positional information update response included with the extracted service class to the position management apparatus.

The subscriber information management apparatus of the present embodiment is characterized in that the service class available for the mobile terminal, included in the subscription information shows whether or not the mobile terminal is allowed to connect to an internet and whether or not the mobile terminal is allowed to connect to the home network.

A position management apparatus of the present embodiment is a position management apparatus included in a mobile communication system in which a home network having a home base station to which a mobile terminal is connected and a core network to which a subscriber information management apparatus, the position management apparatus and an access control apparatus are connected, are connected via a foreign network, comprising: an attach request receiver for receiving an attach request including a mobile terminal identifier from a mobile terminal; a positional information update request transmitter that extracts a mobile terminal identifier from the attach request and transmits a positional information update request including the mobile terminal identifier, to a subscriber information management apparatus; a positional information update response receiver for receiving a positional information update response including a service class available service for the mobile terminal, from the subscriber information management apparatus; and an attach request allow/disallow decider that extracts the service class from the positional information update response and decides whether or not an attach request from the mobile terminal is acceptable, based on the available service.

A home base station of the present embodiment is a home base station included in a mobile communication system in which a home network having the home base station to which a mobile terminal is connected and a core network to which a subscriber information management apparatus, a position management apparatus and an access control apparatus are connected, are connected via a foreign network, comprising: an attachment permission receiver for receiving an attachment permission including a service class, from the position management apparatus; a packet filtering storage for storing packet filtering information in accordance with the service class in order to control communication of a mobile terminal; and, a communication path controller for performing communication path selection control on a mobile terminal being connected, based on the service class included in the attachment permission and the packet filtering information.

A home base station of the present embodiment is a home base station included in a mobile communication system in which a home network having the home base station to which a mobile terminal is connected and a core network to which a subscriber information management apparatus, a position management apparatus and an access control apparatus are connected, are connected via a foreign network, comprising: a local IP access functionality retention notifier for notifying a position management apparatus that the home base station is equipped with local IP access functionality.

1 mobile communication system
   10 PGW
      100 controller
      110 transmitting/receiving unit
      120 packet transmitting/receiving unit
      150 storage
         152 binding information
      160 PMIP processor
   20 SGW
      200 controller
      210 transmitting/receiving unit
      220 packet transmitting/receiving unit
      250 storage
      260 PMIP processor
      270 bearer establishment processor
   30 HSS
      300 controller
      310 transmitting/receiving unit
      350 storage
         352 subscription DB
   40 MME
      400 controller
      410 transmitting/receiving unit
      450 storage
         452 subscription DB
         454 APN-IP address translation DB
   50 GW
      500 controller
      510 transmitting/receiving unit
      520 packet transmitting/receiving unit
      550 storage
   60, 62 home base station
      600 controller
      610 NAT unit
         612 address translation DB
      630 LTE base station unit
         635 external antenna
      650, 658 storage
         652 packet filtering information
         654 IP address pool
         656 access right information
      660 home network interface unit
      670 interface unit used for broadband access network
   70 UE
      700 controller
      710 LTE interface unit
         715 external antenna
      720 packet transmitting/receiving unit
      750 storage
         752 APN list
      770 bearer establishment processor
   80 information terminal
      800 controller
      810 home network interface unit
      850 storage

The invention claimed is:

1. A base station apparatus comprising:
transmitting and/or receiving circuitry configured to:
   receive a signal regarding an attach procedure from a mobile station apparatus;
   transmit, to a position management apparatus, the signal regarding the attach procedure together with a Closed Subscriber Group Identification (CSGID), based on receiving the signal regarding the attach procedure;

receive an attachment acceptance together with first information from the position management apparatus, as a response to the signal regarding the attach procedure, wherein the first information is permission information indicating that Local IP Access (LIPA) is permitted; and transmit an attachment acceptance without including the first information to the mobile station apparatus, after receiving the attachment acceptance.

2. The base station apparatus according to claim 1, wherein the transmitting and/or receiving circuitry is able to transmit second information corresponding to the LIPA for connecting to the network without passing through the core network, and the second information is information provided by the mobile station apparatus.

3. The base station apparatus according to claim 1, wherein the receiving and/or transmitting circuitry is able to transmit third information corresponding to the LIPA for connecting to an Internet, and the third information is information provided by the mobile station apparatus.

4. A mobile station apparatus comprising: transmitting and/or reception circuitry configured to:

transmit a signal regarding an attach procedure; and receive an attachment acceptance without including first information, as a response to the signal regarding the attach procedure, wherein the transmitting and/or reception circuitry is able to transmit second information corresponding to Local IP access (LIPA) for connecting to a network without passing through a core network, the first information is permission information indicating that the LIPA is permitted, and in a case that the mobile station apparatus is allowed to use the LIPA for connecting to the network without passing through the core network, the transmitting and/or reception circuitry is able to perform, by using the LIPA, a data reception and transmission with the network without passing through the core network, wherein the attachment acceptance without including the first information is sent by a base station apparatus which received, from a position management apparatus, an attachment acceptance together with the first information.

5. The mobile station apparatus according to claim 4, wherein the transmitting and/or reception circuitry is able to transmit third information corresponding to the LIPA for connecting to an Internet.

* * * * *